(12) United States Patent
Haber

(10) Patent No.: US 9,576,252 B2
(45) Date of Patent: Feb. 21, 2017

(54) TEST OPERATION AND REPORTING SYSTEM

(75) Inventor: Bernd Haber, Phoenix, AZ (US)

(73) Assignee: ACCENTURE GLOBAL SERVICES LIMITED, Dublin (IE)

(*) Notice: Subject to any disclaimer, the term of this patent is extended or adjusted under 35 U.S.C. 154(b) by 281 days.

(21) Appl. No.: 13/097,387

(22) Filed: Apr. 29, 2011

(65) Prior Publication Data
US 2012/0278135 A1 Nov. 1, 2012

(51) Int. Cl.
G06Q 40/00 (2012.01)
G06Q 10/00 (2012.01)
G06Q 10/06 (2012.01)
H04Q 11/00 (2006.01)

(52) U.S. Cl.
CPC .......... *G06Q 10/00* (2013.01); *G06Q 10/0639* (2013.01); *G06Q 10/06395* (2013.01); *H04Q 2011/0083* (2013.01)

(58) Field of Classification Search
CPC ..................... G06Q 10/0639; G06Q 10/06395; G06F 11/3409
See application file for complete search history.

(56) References Cited

U.S. PATENT DOCUMENTS

| | | | |
|---|---|---|---|
| 5,933,475 A * | 8/1999 | Coleman | 379/10.01 |
| 6,185,506 B1 * | 2/2001 | Cramer et al. | 506/8 |
| 6,279,124 B1 * | 8/2001 | Brouwer et al. | 714/38.11 |
| 6,363,053 B1 * | 3/2002 | Schuster et al. | 370/230 |
| 6,454,460 B1 * | 9/2002 | Ramanathan et al. | 378/207 |
| 6,473,794 B1 * | 10/2002 | Guheen et al. | 709/223 |
| 6,643,607 B1 * | 11/2003 | Chamberlain et al. | 702/170 |
| 6,643,613 B2 * | 11/2003 | McGee et al. | 702/186 |
| 6,816,798 B2 * | 11/2004 | Pena-Nieves et al. | 702/84 |
| 6,928,472 B1 * | 8/2005 | Wen | 709/223 |
| 7,082,381 B1 * | 7/2006 | Saghier et al. | 702/182 |
| 7,197,428 B1 * | 3/2007 | Saghier et al. | 702/182 |
| 7,286,247 B2 * | 10/2007 | Archie et al. | 356/625 |
| 7,881,438 B2 * | 2/2011 | Cioffi et al. | 379/1.04 |
| 8,140,578 B2 * | 3/2012 | Johnson | G06F 17/30961 707/791 |
| 8,200,527 B1 * | 6/2012 | Thompson et al. | 705/7.39 |
| 8,264,385 B1 * | 9/2012 | Dewan et al. | 341/50 |
| 8,374,974 B2 * | 2/2013 | Chen et al. | 706/8 |

(Continued)

FOREIGN PATENT DOCUMENTS

WO 2007/099075 A1 9/2007

*Primary Examiner* — Matthew Gart
*Assistant Examiner* — Stephen S Swartz
(74) *Attorney, Agent, or Firm* — Mannava & Kang, P.C.

(57) ABSTRACT

A test operation and reporting system is operable to evaluate testing of a system under test (SUT). The test operation and reporting system includes a testing metrics selection engine to identify core metrics and one or more optional metrics to evaluate a testing service level of one or more tests performed on the SUT. A metrics compilation module determines measurements for the core metrics and optional metrics. A trend evaluation module determines whether a trend determined from the metrics meets an associated target, and identifies a metric indicator to explain the trend if the associated target is not met. A dashboard engine generates a plurality of views based on selections. The views are operable to include the trend, an associated target, the core metrics and optional metrics, the metric indicator and other metrics.

19 Claims, 23 Drawing Sheets

(56) References Cited

U.S. PATENT DOCUMENTS

| | | | |
|---|---|---|---|
| 8,544,087 B1* | 9/2013 | Eskin et al. | 726/22 |
| 8,639,748 B2* | 1/2014 | Kazerani et al. | 709/203 |
| 2002/0152304 A1* | 10/2002 | Collazo | 709/224 |
| 2007/0282876 A1* | 12/2007 | Diao | G06Q 10/06 |
| 2008/0016412 A1* | 1/2008 | White et al. | 714/48 |

\* cited by examiner

| Metric Title (New) | Metric Title (Alternative) | Definition | Purpose / Objectives | Recommended Targets | Cluster |
|---|---|---|---|---|---|
| Test Artifact Development Trend | Test Artifact Development Rate | % cumulative # of artifacts developed / cumulative # of artifacts planned to be developed | This metric represents the test planning status of test related deliverables at various stages of the test phase. Test artifacts can be test requirements, test conditions, test cases, use cases, or scripts. Metrics Indicator: Trend is unfavorable due to insufficient resource capacity or unmanaged test scope changes Corrective & Preventative Actions: Optimize test team resource capacity according to skills and experience; Start measuring actuals and revise test workplans accordingly Purpose: Analyze of productivity of testing team to show how efficient they manage actual artifact development efforts against the planned target | >90% per planned time period, e.g. day / week of test planning | 1 |
| Test Artifact Execution Trend | Test Artifact Execution Rate (% Scripts Executed) | % cumulative # of artifacts executed / cumulative # of artifacts planned to be executed | This metric represents the test execution status of test related deliverables during the run of tests. Test artifacts can be test conditions, test cases, use cases, or scripts. Metrics Indicator: Trend is unfavorable due to problems with test environment availability or corrupt test data; or due to unrealistic test cycle execution plans Corrective & Preventative Actions: Optimize test team resource capacity according to skills and experience; Improve test project effort and milestone estimation using more accurate estimation factors Purpose: Analyze of productivity of testing team to show how efficient they manage actual artifact execution efforts against the planned target | >80% pass 1 >90% pass 2 95-100% final pass (with no sev 1) | 1 |
| Test Artifact Pass Trend | Test Artifact Pass Rate (% Scripts Passed) | % cumulative # of artifacts passed / cumulative # of artifacts executed | This metric represents the level of quality of the delivered solution at various stages the delivery life cycle. Test artifacts can be requirements, test conditions, test cases, use cases, or scripts. Metrics Indicator: Trend unfavorable due to poor code quality, test environment/infrastructure problems, or due to test scope changes Corrective & Preventative Actions: Increase re-test effort or detailed defect root cause analysis Purpose: Success indicator how well the solution meets test requirements | >60% pass 1 >75% pass 2 >90% final pass (with no sev 1) | 1 |

TABLE 1
FIG. 2

| Metric Title (New) | Metric Title (Alternative) | Definition | Purpose / Objectives | Recommended Targets | Cluster |
|---|---|---|---|---|---|
| Defect Age | Average Defect Age by Severity | Total Elapsed time for assigned or accepted defects by severity or priority | This metric measures the ability of an organization to manage the resolution of defects effectively according to defect priority or severity.<br>Metrics Indicator: Unfavorable trends due to in-proper usage of defect fixing prioritization or leads of defect owners do not manage their organization resources efficiently.<br>Corrective & Preventative Actions: Start to monitor actual defect aging by priority or start to allocate resources to defect fix activities based on skills and seniority<br>Purpose: Analyze of productivity of entire project team to resolve defects against set and agreed upon defect resolution SLAs | As SLA:<br>1-2 hours for prio 1<br>2-4 hours for prio 2<br>4-8 hours for prio 3<br>8 hours for prio 4 | 2 |
| Fix Backlog Trend | Fix Backlog (Defect Acceptance Rate) | Cumulative # or % of defects assigned per day or as of date by priority OR as a % of total opened per day | This metric measures the productivity of development organizations to successfully route defects through a triage process and fix defects.<br>Metrics Indicator: Unfavorable trends due to in-proper usage of defect fixing prioritization or due to development leads do not manage test organization resources efficiently<br>Corrective & Preventative Actions: Start to monitor actual defect fixing turnaround time or start to allocate resources to defect fixing activities based on skills and seniority<br>Purpose: Analyze of productivity of defect owning team, such as development team, to show how efficient they can analyze and fix the problem | As SLA:<br>>95% for prio 1<br>>85% for prio 2<br>>75% for prio 3<br>>50% for prio 4 | 2 |
| Retest Backlog Trend | Retest Backlog | Cumulative # or % of defects ready for review per day or as of date by priority OR as a % of total opened per day | This metric measures the productivity of test organizations to effectively retest defects that have been fixed and migrated.<br>Metrics Indicator: Unfavorable trends due to in-proper usage of defect retesting prioritization or due to test leads do not manage test organization resources efficiently<br>Corrective & Preventative Actions: Start to monitor actual defect retest turnaround time or start to allocate resources to defect retest activities based on skills and seniority<br>Purpose: Analyze of productivity of testing team to show how efficient they can retest the problem | As SLA:<br>>95% for prio 1<br>>85% for prio 2<br>>75% for prio 3<br>>50% for prio 4 | 2 |

TABLE 1
FIG. 2 (cont.)

| Metric Title (New) | Metric Title (Alternative) | Definition | Purpose / Objectives | Recommended Targets | Cluster |
|---|---|---|---|---|---|
| Defect Closure Trend | Defect Closure Rate | Cumulative # or % of defects closed (fix+retested) per day or as of date by severity or priority | This metric measures the productivity of organizations with respect to successfully fixing and retesting defects. Metrics Indicator: Unfavorable trends due to complexity of defect resolution is higher anticipated or productivity delays during defect triage, fixing or retesting Corrective & Preventative Actions: Identify the sources of delay – bottlenecks – and action corrective measures or a thorough root cause analysis will help detect the barriers to quality delivery Purpose: Analyze of productivity of entire project team to resolve (fix and retest) defects in given time frames, such as test cycles | As SLA: >95% for prio 1 >85% for prio 2 >75% for prio 3 >50% for prio 4 | 2 |
| Defect to Artifact Trend | Defect Rate | Cumulative # of defects / total artifacts executed or reviewed | This metric assess the quality of tested solutions in relationship to test scope as represented by the test artifacts. | Flat or decreasing trend during test phase duration | 4 |
| Cost of Poor Quality (Rework) | Rework Effort; Non-value add effort | Total actual cost (effort) of rework / Total Actual cost (effort) x 100 Note: This requires a more detail WBS breakdown in the Time Tracking workplan to add a dedicated 'rework/fix' task per each phase of the project life cycle and within the test phase for each test stage, such as for both system test and system integration test Interim Solution: Let teams that work on defect resolutions, such as fixing code, test data or a configuration estimate the effort they spend and summarize it as a % of the total test effort actuals | This metric illustrates the amount of effort spent performing rework on deliverables due to problems. Metrics Indicator: Low quality due to high rework effort or capturing defects occurs later on rather on early on or skill level of resources is low Corrective & Preventative Actions: Increase quality of code or deliverables; focus on defect prevention or improve skill resources Purpose: Indicator of how much is being spent on rework during the SDLC as a % of the total spend | <5-7% of total actual project effort | 6 |

TABLE 1
FIG. 2 (cont.)

| Metric Title (New) | Metric Title (Alternative) | Definition | Purpose / Objectives | Recommended Targets | Cluster |
|---|---|---|---|---|---|
| Defect Removal Effectiveness | Test Effectiveness | Problems Detected Pre-Release / Total (Pre + Post-Release Problems); also by SDLC phase | This metric measures how effectively the engagement removes problems (defects, errors, faults) during a project. Metrics Indicator: Low % is an indicator of insufficient testing coverage or test training needs Corrective & Preventative Actions: More rigor in testing; risk-based testing and applied statistics to better manage test coverage; test training Purpose: Indicator how well defects are caught during testing before moving to the next SDLC phase | >95% with no sev 1 | 8 |
| Artifact Sign-off Status | Script Sign-off %age | Cumulative # of artifacts signed-off / total # of artifacts planned for sign-off | This metric measures the ability of test organizations to manage the approval of test scenarios as represented by set of scripts for assigned test cycles, passes, or entire test phases before the planned start of test execution. Metrics Indicator: Sign-off process is lagging due to lack of resources or commitment to conduct review and sign-off, or due to delays in artifact development Corrective & Preventative Actions: Improve upfront planning with options for managing bottlenecks Purpose: Success indicator how well the test team is managing the review and approval of required test artifact by designated stakeholders | 95-100% per planned milestone | 8 |

TABLE 1
FIG. 2 (cont.)

| Metric Title (New) | Metric Title (Alternative) | Definition | Purpose / Objectives | Recommended Targets | Cluster |
|---|---|---|---|---|---|
| Acceptance Backlog Trend | Defect Acceptance Rate | Cumulative # or % of defects accepted per day or as of date by priority | This metric measures the productivity of organizations to accept a defect as owner the first time. | SLA with defect owners | 2 |
| Triage Backlog Trend | n/a | Cumulative # or % of defects not yet assigned per day or as of date by priority | This metric measures the productivity of organizations to effectively assign a defect owner the first time. | As SLA: >95% for prio 1 >85% for prio 2 >75% for prio 3 >50% for prio 4 | 2 |
| Defect Arrival Trend | Defect Arrival Rate | Cumulative # or % of defects opened per day or as of date by severity or priority | This metric measures the ability of a testing organization to detect problems with solutions that fail expected standards. | Trending toward 0 over time | 3 |
| Defect Re-Open Trend | Defect Re-open Rate | Cumulative # or % of defects re-opened per day or as of date by severity or priority | This metric measures the work quality of organizations with respect to successfully resolving defects the first time. | Trending toward 0 over time | 3 |
| Defect to Size Trend | Defect Density | Cumulative # of defects / size (Funct. Points, Test Points, KLOC, etc.) | This metric helps to assess the quality of tested solutions in relationship to test scope as represented by the solution size. | See CMM benchmarks using FP or KLOC or Test Points as size measure | 4 |
| Requirement Fix Trend | n/a | Cumulative # of questions or issues or defects raised against requirements | This metric measures the quality of requirements. | N/A | 5 |
| Requirement Volatility | n/a | Total # of Approved Change Controls / Total # of Requirements (original approved scope) * 100 | This metric measures the scope or phase containment related to the quality of requirements. | Flat or decreasing trend across multiple releases/projects | 5 |
| Test Coverage | n/a | % process scenarios or % uses cases or % requirements tested | This metric analyzes the extend of validation efforts regarding test stakeholder expectations. | >60% pass 1 >75% pass 2 >90% final pass | 5 |
| Cost of Quality | Cost of Testing | Total actual cost (effort) of QA (testing + quality reviews) / Total Actual cost (effort) x 100 | This metric measures the amount of effort an engagement invests in quality-related activities. | 25-55% of total actual project effort | 6 |

TABLE 2
FIG. 3

| Metric Title (New) | Metric Title (Alternative) | Definition | Purpose / Objectives | Recommended Targets | Cluster |
|---|---|---|---|---|---|
| Script Execution Time | n/a | Total elapsed time for script execution / total # of scripts executed | This metric measures the productivity of test organizations to manage test execution and serves as baseline for test automation and associated ROI. | MANUAL: 0.5 hours (SIMPLE script w/ 5-10 steps) 1 hour (MEDIUM script w/ 10-20 steps) 2 hours (COMPLEX script w/ >20 steps) | 7 |
| Test Automation Penetration | %age Automation Penetration (Regression) | Total # of scripts automated / total # of scripts | This metric shows the quantity of testing that is driven by test automation, such as for regression testing. | based on ROI & application technology and platform | 7 |
| Phase Exit Trend | Phase Exit Rate | Cumulative # or % of defects not closed by severity and by SDLC phase | This metric represents the ability of organizations to manage phase containment during the solution delivery life cycle. | No sev 1 <10% sev 2 <25% sev 3 <50% sev 4 | 8 |
| Root Cause Trend | Root Cause Rate | Cumulative # or % of defects closed (by root cause) per day or as of date by severity | This metric represents the quality categories of solutions delivered by development, test and other test supporting teams, such as related to code, environment/infrastructure, application configuration or data conversion. | Individual by root cause | 8 |
| Budget Adherence | Budget Variance | ADM: - Cost Performance Index = CPI = Earned Value / Actual Cost = EV / AC) or - Cost Variance = CV = Earned Value - Actual Cost = EV - AC) | Standard PPM measure to ensure solution delivery according to agreed upon budgets. Metrics Indicator: Unfavorable CPI and CV trends due to unmanaged scope changes or unexpected test process interruption Corrective & Preventative Actions: Preventative planning and strict change control management; Clear directions on workplan baselining and budget contingency Purpose: Indicator of how well the test team operates against baselined and approved budgets | +/- <5% under / over budget based on total project volume | 9 |

TABLE 2
FIG. 3 (cont.)

| Metric Title (New) | Metric Title (Alternative) | Definition | Purpose / Objectives | Recommended Targets | Cluster |
|---|---|---|---|---|---|
| Earned Value Trend | Test Effort Rate | Standard PPM: EV - Earned Value as the ratio between budget and % complete | This metric helps to analyze the investment made on testing and the total investment made on the delivery of an IT solution. It is an indicator of how much testing was accomplished to ensure the expected quality of the solution. | Planned amount of work, e.g. # of scripts developed according to given budgets and schedules | 9 |
| Schedule Adherence | Schedule Variance | ADM:<br>- Schedule Performance Index = SPI = Earned Value / Planned Value = EV / PV)<br>or<br>- Schedule Variance = SV = Earned Value - Planned Value = EV - PV) | Standard PPM measure to ensure solution delivery according to agreed upon project milestones.<br>Metrics Indicator: Unfavorable SPI and SV trends due to unmanaged scope changes or unexpected test process interruption<br>Corrective & Preventative Actions: Preventative planning and strict change control management<br>Purpose: Indicator of how well the test team operates against baselined and approved schedules | +/- <5% ahead of / behind schedule based on project phase duration | 9 |
| Artifact Review Effectiveness | Review Effectiveness (Test Scripts) | (No of Internal Review Defects)/(No of External Review Defects + No of Internal Review Defects) | This metric measures the quality of deliverables using internal and external (independent) QA review criteria, such as QPI. | Program peer review SLAs | 1 |
| On- / Offshore Resource Ratio | On- / Offshore Ratio | % of resources onshore vs. offshore | This metric helps managing cost-effective team utilization. | 60/40 - During mobilization<br>>80/20 for steady state | 10 |
| Risk-Based Testing Score | Risk level | Risk ratio = current risk score / baseline risk score for requirements or process scenarios or test cases | This metric helps test organizations managing the scope and priorities of testing in collaboration with its stakeholders. | Flat or decreasing risk trend during SDLC duration | 8 |
| Test Data Timeliness | Timeliness - Test Data Requests | # of test data profiles created as per test execution start date / total # of data profiles planned for creation | This metric measures the productivity of test organizations to prepare test data in adherence with project plan milestones. | >90% per planned time period, e.g. day / week of test planning | 7 |

TABLE 2
FIG. 3 (cont.)

| Metric Title (New) | Metric Title (Alternative) | Definition | Purpose / Objectives | Recommended Targets | Cluster |
|---|---|---|---|---|---|
| Test Downtime | % of Test Downtime Time | Total elapsed testing down time due to environment, data or code problems / Total elapsed actual test execution time | This metric measures the time of interruption during test execution caused by problems with infrastructure, data or code / configuration quality. | <3-5% of defects due to environment problems | 7 |
| Test Maturity Level | CMMi Process Maturity Level | TMMi score post a maturity assessment of an enterprise/business unit across identified test areas | This metric measures the maturity of a test operation/organization in order to address gaps and opportunities for corresponding investments and service improvements. | > Level 3 | 10 |
| Test Investment ROI | Investment Effectiveness | Financial gain % (e.g. cost reduction) due to targeted investments in test process optimization, test tool capabilities or test operation centralization | This metric measures the effectiveness of investments in testing related to a corresponding business case. | 20% - 70% (Accenture/Forrester Study 2009) | 10 |
| Customer Satisfaction | Stakeholder Satisfaction | Point in time satisfaction level across the categories: Overall Performance, Service Delivery Reliability, Service Delivery Value. | This metrics measures the level of satisfaction toward test services delivered as perceived by identified customers, such as project managers or senior application leads. | >5.0 on a 1-7 scale with 7 being the most satisfied | 10 |
| Defect Rejection Trend | Defect Rejection Rate | Cumulative # or % of defects rejected per day or as of date by severity or priority | This metric measures the work quality of organizations with respect to successfully assigning (triaging) defect ownership the first time. | Trending toward 0 over time | 3 |
| Operation Transition Status | n/a | Cumulative % of accomplished checkpoint items within the mobilization domains Commercials, People, Process and Technology | This metric measures the accomplishment % operations transition / mobilization across the mobilization domains Commercials, People, Process and Technology. | Trending toward 100% during mobilization period (RED: 0-50%; AMBER 50-70%; GREEN 70-100%) | 11 |
| Operation Capacity Status | n/a | Cumulative (forecasted) FTE count contracted vs. projected actual capacity vs. service demand capacity | This metrics measures the discrepancy between agreed upon contractual FTE capacity, the actual/forecasted FTE capacity and the amount of work (demand of service requests) allocated to the test operation unit. | % deviation (+/-) from contractual agreed upon ranges | 12 |

TABLE 2
FIG. 3 (cont.)

| Cluster # | Cluster Name | Cluster Description and Objective | Metrics in the Cluster | Expected (Y/N) |
|---|---|---|---|---|
| 1 | Test Artifact Management | | | |
| | | This TMF Metric Cluster focuses on a test operation's ability to effectively manage test artifacts, such as test scenarios, test cases, or test scripts during test preparation and test execution for every test phase of a SDLC. It helps test leads prioritizing the work effort allocation, manage test scope, and obtain an indication of the quality of the IT solution under test. | Test Artifact Development Trend | Y |
| | | | Test Artifact Execution Trend | Y |
| | Key Question Asked: How well does the test operation manage test scope in correlation to the IT solution quality? | | Test Artifact Pass Trend | Y |
| | | | Artifact Review Effectiveness | |
| 2 | Defect Productivity | | | |
| | | This TMF Metric Cluster focuses on a test operation's ability to efficiently manage the timely and proper resolution of defects during test execution. Typically, the test team is responsible for coordinating the defect resolution (by priority/severity) with various participating parties, such as development teams, business teams (during UAT), or 3rd party vendors during a E2E integration test. Each metric of this cluster focuses on individual defect life cycle key participants. This cluster also supports the establishment of relevant OLAs, or SLAs regarding timely defect resolution actions. | Acceptance Backlog Trend | |
| | | | Defect Age | Y |
| | Key Question Asked: How efficient is the test operation with resolving defects in a timely manner according to agreed upon expectations? | | Fix Backlog Trend | Y |
| | | | Retest Backlog Trend | Y |
| | | | Triage Backlog Trend | |
| | | | Defect Closure Trend | Y |
| 3 | Defect Extended Management | | | |
| | | This TMF Metric Cluster focuses on the extended aspects of a mature defect management process. For some organizations, it may make business sense, for example due to contractual agreements, to monitor the metric measurements of this cluster from a resolution expectation perspective. | Defect Arrival Trend | |
| | Key Question Asked: How effective is the test operation with resolving defects in a proper manner according to agreed upon expectations? | | Defect Re-Open Trend | |
| | | | Defect Rejection Trend | |
| 4 | Defect Density | | | |
| | | This TMF Metric Cluster focuses on a set of metrics to normalize the level of a IT solution quality in order to be able to conduct cross-projects/release analysis or even cross-business portfolio analysis. It also provides a reference to do internal and/or external benchmarking, such as with Forrester or Gartner. | Defect to Artifact Trend | Y |
| | Key Question Asked: How effective is the defect management process in comparison to others? | | Defect to Size Trend | |

TABLE 3
FIG. 4

| Cluster # | Cluster Name | Cluster Description and Objective | Metrics in the Cluster | Expected (Y/N) |
|---|---|---|---|---|
| 5 | Test & Requirement Coverage | | | |
| | Key Question Asked: Do the test efforts actually match what is in scope? | This TMF Metric Cluster focuses on managing an agreed upon test scope against priorities of related tasks during a test phase. It also links the testing efforts to scope management concepts, such as requirement traceability matrix or model based testing. Linking the testing efforts to a scope reference, such as a set of requirements, or a set of business processes, or a set of uses cases, etc. is one of the most difficult and challenging test management responsibilities in client environments. | Requirement Fix Trend | |
| | | | Requirement Volatility | |
| | | | Test Coverage | |
| 6 | Cost of Testing | | | |
| | Key Question Asked: How much does testing actually cost? | This TMF Metric Cluster focuses on the cost of testing, a topic that is typically under-represented in even more mature test operations. Consequently, tracking it in an even basic manner helps organizations establish the baseline for test budget related conversations and business case/return on investment related conversations with senior IT leads. | Cost of Poor Quality (Rework) | Y |
| | | | Cost of Quality | |
| 7 | Test Process Productivity | | | |
| | Key Question Asked: What is the efficiency of the test process execution? | This TMF Metric Cluster focuses on aspects of an efficient test operation that involves manual vs. automated execution activities related to functional testing, test data management and test environment management (e.g. smoke testing). Typically, these are the areas that cause the most problems in early cycles of SDLC test phases. | Script Execution Time | |
| | | | Test Automation Penetration | |
| | | | Test Data Timeliness | |
| | | | Test Downtime | |
| 8 | Phase/Stage Containment | | | |
| | Key Question Asked: How well does the test operation contribute to a proper project phase/stage containment? | This TMF Metric Cluster focuses on the quality assurance/quality engineering aspects of a IT solution delivery. The metrics in this cluster allow for proper phase entry/exit criteria definition and hence, a managed transition from one SDLC phase to the next and from development/testing to a production environment. | Phase Exit Trend | |
| | | | Root Cause Trend | |
| | | | Defect Removal Effectiveness | Y |
| | | | Risk-Based Testing Score | |
| | | | Artifact Sign-off Status | Y |

TABLE 3
FIG. 4 (cont.)

| Cluster # | Cluster Name | Cluster Description and Objective | Metrics in the Cluster | Expected (Y/N) |
|---|---|---|---|---|
| 9 | Cost / Schedule / PPM | | | |
| | Key Question Asked: How well does the test operation adhere to standard cost and schedule delivery expectations? | This TMF Metric Cluster focuses on the project management aspects of a testing effort (as standalone or part of a project/program) using standard PPM related measures, like SPI, CPI, SV, CV or EVA. | Budget Adherence | |
| | | | Earned Value Trend | |
| | | | Schedule Adherence | |
| 10 | Maturity | | | |
| | Key Question Asked: How mature is the test operation with respect to its service delivery? | This TMF Metric Cluster focuses on the unit level operations aspects across a TCoE/Testing Factory across multiple projects/releases. The metrics in this cluster support the testing operations lead with managing contractual (e.g. SLA / OLA) obligations as agreed upon regarding the expected test service delivery. | On- / Offshore Resource Ratio | |
| | | | Test Maturity Level | |
| | | | Test Investment ROI | |
| | | | Customer Satisfaction | |
| 11 | Operation Transition Management | | | |
| | Key Question Asked: What is the status of the operations transition/mobilization? | This TMF Metric Cluster focuses on the aspects related to the mobilization of a test operation following the definition of the operating and governance model until a steady state ('run') has been achieved. It monitors key activities that are required to execute across the domains Commercials, People, Process, and Technology. | Operation Transition Status | |
| 12 | Operation Capacity Management | | | |
| | Key Question Asked: How well does the test operation manage resource capacity against service demand? | This TMF Metric Cluster focuses on the aspects related to the proper management of resource capacity against the demand for test services. The metrics in this cluster support the testing operations lead with the required measures to manage a proper resource staffing according to cyclical demand fluctuations against related contractual obligations and agreements. | Operation Capacity Status | |

TABLE 3
FIG. 4 (cont.)

TABLE 4
Metrics – By Metric Domain

| | Quality | Cycle Time / Productivity | Cost / Effort | Test Maturity |
|---|---|---|---|---|
| Core Metrics | ▪ Test Artifact Pass Trend<br>▪ Defect To Artifact Trend<br>▪ Defect Removal Effectiveness<br>▪ Artifact Sign-Off Status | ▪ Test Artifact Development Trend<br>▪ Test Artifact Execution Trend<br>▪ Defect Age<br>▪ Fix Backlog Trend<br>▪ Retest Backlog Trend<br>▪ Defect Closure Trend | ▪ Cost of Poor Quality | |
| Optional Metrics | ▪ Defect Arrival Trend<br>▪ Defect Re-Open Trend<br>▪ Defect To Size Trend<br>▪ Requirement Fix Trend<br>▪ Requirement Volatility<br>▪ Test Coverage<br>▪ Phase Exit Trend<br>▪ Root Cause Trend<br>▪ Artifact Review Effectiveness<br>▪ Risk-Based Testing Score<br>▪ Defect Rejection Trend | ▪ Acceptance Backlog Trend<br>▪ Triage Backlog Trend<br>▪ Defect Arrival Trend<br>▪ Script Execution Time<br>▪ Test Automation Penetration<br>▪ Schedule Adherence<br>▪ Test Data Timeliness<br>▪ Test Downtime | ▪ Cost of Quality<br>▪ Test Automation Penetration (ROI)<br>▪ Budget Adherence<br>▪ Earned Value Trend<br>▪ On-/Offshore Resource Ratio | ▪ Test Maturity Level<br>▪ Test Investment ROI<br>▪ Customer Satisfaction |

FIG. 5

TABLE 5
Test Metrics – By TEST PHASE

| Analyze | Design | Build | Test | Deploy |
|---|---|---|---|---|
| ▪ Defect Age<br>▪ Fix Backlog Trend<br>▪ Defect Closure Trend<br>▪ Defect To Artifact Trend<br>▪ Defect Removal Effectiveness<br>▪ Cost of Poor Quality | ▪ Defect Age<br>▪ Fix Backlog Trend<br>▪ Defect Closure Trend<br>▪ Defect To Artifact Trend<br>▪ Defect Removal Effectiveness<br>▪ Cost of Poor Quality | ▪ Defect Age<br>▪ Fix Backlog Trend<br>▪ Defect Closure Trend<br>▪ Defect To Artifact Trend<br>▪ Defect Removal Effectiveness<br>▪ Cost of Poor Quality | ▪ Defect Age<br>▪ Fix Backlog Trend<br>▪ Defect Closure Trend<br>▪ Defect To Artifact Trend<br>▪ Defect Removal Effectiveness<br>▪ Test Artifact Development / Execution / Pass Trend<br>▪ Retest Backlog Trend<br>▪ Artifact Sign-Off Status<br>▪ Cost of Poor Quality | ▪ Defect Age<br>▪ Fix Backlog Trend<br>▪ Defect Closure Trend<br>▪ Defect To Artifact Trend<br>▪ Defect Removal Effectiveness<br>▪ Cost of Poor Quality |
| ▪ Acceptance Backlog Trend<br>▪ Defect Arrival Trend<br>▪ Cost of Quality<br>▪ Phase Exit Trend<br>▪ Root Cause Trend<br>▪ Budget Adherence<br>▪ Schedule Adherence<br>▪ Artifact Review Effectiveness<br>▪ On-/Offshore Resource Ratio<br>▪ Risk-Based Testing Score<br>▪ Requirement Fix Trend & Volatility | ▪ Acceptance Backlog Trend<br>▪ Defect Arrival Trend<br>▪ Cost of Quality<br>▪ Phase Exit Trend<br>▪ Root Cause Trend<br>▪ Budget Adherence<br>▪ Schedule Adherence<br>▪ Artifact Review Effectiveness<br>▪ On-/Offshore Resources Ratio<br>▪ Risk-Based Testing Score<br>▪ Requirement Fix Trend & Volatility | ▪ Acceptance Backlog Trend<br>▪ Defect Arrival Trend<br>▪ Cost of Quality<br>▪ Phase Exit Trend<br>▪ Root Cause Trend<br>▪ Budget Adherence<br>▪ Schedule Adherence<br>▪ Artifact Review Effectiveness<br>▪ On-/Offshore Resource Ratio<br>▪ Risk-Based Testing Score<br>▪ Requirement Fix Trend & Volatility<br>▪ Test Automation Penetration | ▪ Acceptance Backlog Trend<br>▪ Defect Arrival Trend<br>▪ Cost of Quality<br>▪ Phase Exit & Root Cause Trend<br>▪ Budget & Schedule Adherence<br>▪ Artifact Review Effectiveness<br>▪ On-/Offshore Resource Ratio<br>▪ Risk-Based Testing Score<br>▪ Requirement Fix Trend & Volatility<br>▪ Test Automation Penetration<br>▪ Triage Backlog Trend<br>▪ Defect Re-Open & Rejection Trend<br>▪ Defect To Size Trend<br>▪ Test Coverage & Test Downtime<br>▪ Script Execution Time<br>▪ Earned Value Trend<br>▪ Test Data Timeliness | ▪ Acceptance Backlog Trend<br>▪ Defect Arrival Trend<br>▪ Cost of Quality<br>▪ Phase Exit Trend<br>▪ Root Cause Trend<br>▪ Budget Adherence<br>▪ Schedule Adherence<br>▪ Artifact Review Effectiveness<br>▪ On-/Offshore Resource Ratio<br>▪ Risk-Based Testing Score<br>▪ Requirement Fix Trend & Volatility |

Core Metrics (top row) / Optional Metrics (bottom row)

FIG. 6

TABLE 6
Test Metrics – By Trend Perspective and Level

| In-Process (Leading) | Post-Release (Lagging) | Test Operations |
|---|---|---|
| • Test Artifact Development Trend<br>• Test Artifact Execution Trend<br>• Test Artifact Pass Trend<br>• Defect Age<br>• Fix Backlog Trend<br>• Retest Backlog Trend<br>• Defect To Artifact Trend<br>• Artifact Sign-Off Status | • Test Artifact Pass Trend<br>• Defect Age<br>• Defect To Artifact Trend<br>• Defect Removal Effectiveness<br>• Cost of Poor Quality | |
| • Acceptance Backlog Trend<br>• Triage Backlog Trend<br>• Defect Arrival Trend<br>• Defect Re-Open Trend<br>• Test Coverage<br>• Phase Exit Trend<br>• Root Cause Trend<br>• Budget Adherence<br>• Earned Value Trend<br>• Schedule Adherence<br>• On-/Offshore Resource Ratio<br>• Risk-Based Testing Score<br>• Test Downtime<br>• Defect Rejection Trend | • Defect To Size Trend<br>• Requirement Fix Trend<br>• Requirement Volatility<br>• Cost of Quality<br>• Script Execution Time<br>• Test Automation Penetration<br>• Root Cause Trend<br>• Budget Adherence<br>• Earned Value Trend<br>• Schedule Adherence<br>• Artifact Review Effectiveness<br>• On-/Offshore Resource Ratio<br>• Test Data Timeliness | • Test Maturity Level<br>• Test Investment ROI<br>• Customer Satisfaction<br>• Operation Transition Status<br>• Operation Capacity Status |

Core Metrics (top row) / Optional Metrics (bottom row)

FIG. 7

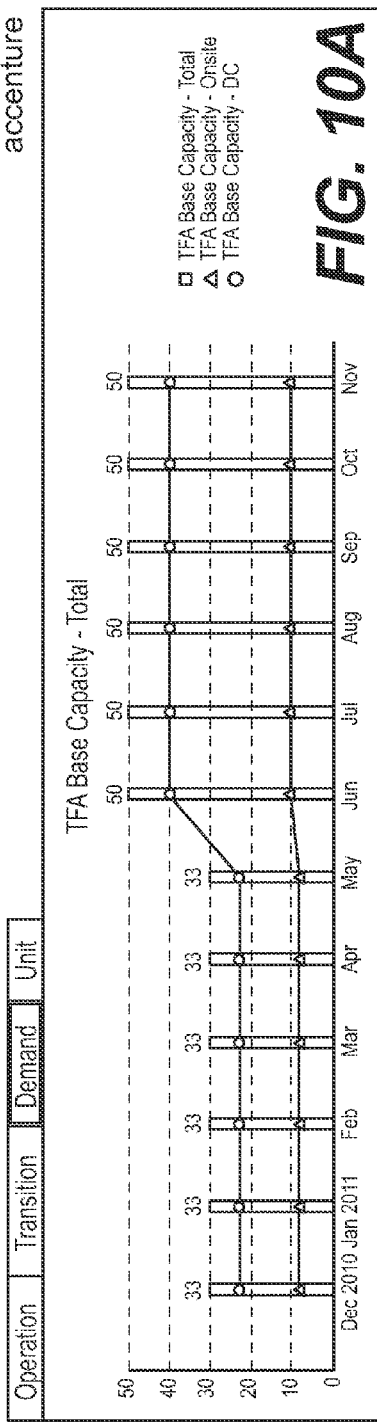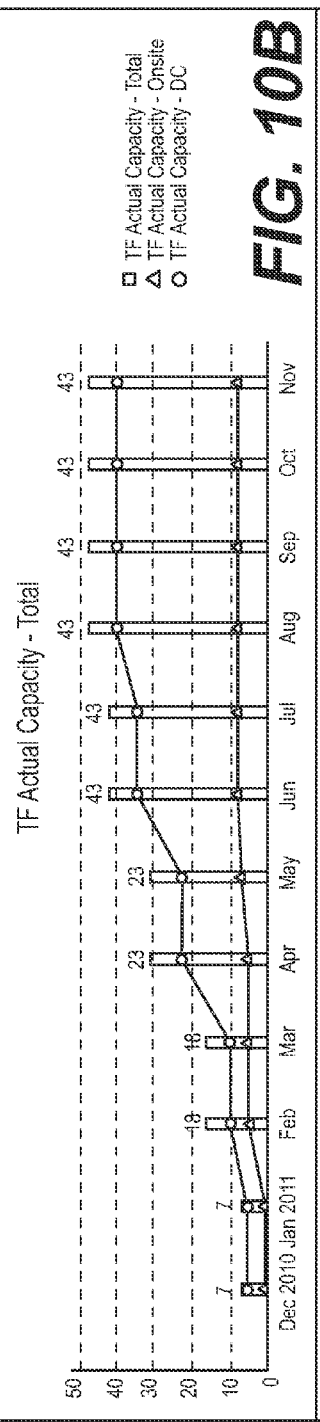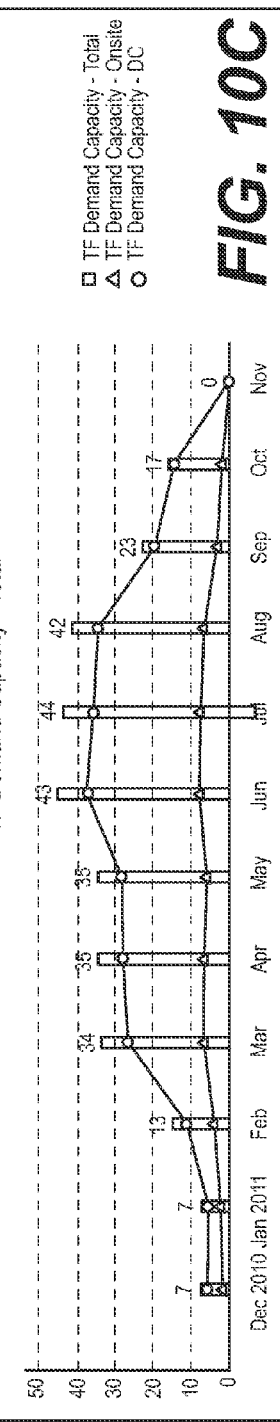
FIG. 10A
FIG. 10B
FIG. 10C

FIG. 12

TEST OPERATION AND REPORTING SYSTEM

BACKGROUND

Most information technology (IT) organizations have invested in one or multiple test management tools for managing testing efforts and associated resources for related IT solution implementations. Test management is the overarching activity associated with the testing of a Solution Under Test (SUT). The SUT may include software, middleware, hardware and other types of IT system components. The tests may include functional and non-functional testing, such as performance testing or defect resolution management prior to releasing a newly developed SUT or enhanced versions of a SUT in to a production environment. They may also include tests that are done in production environment, such as regression testing system upgrade validations.

The purpose of a test management tool is to assist a Quality Assurance Manager (QAM) with evaluating the quality of the SUT before releasing it into a production environment. However, given the diversity of IT solutions and underlying systems and the variety of correlated business objectives for implementing such solutions including related IT management constraints, it is often difficult to provide the QAM with the required and current management information that is most pertinent to the specific SUT. Accordingly, IT organizations may have to rely on data that, at given points in time, does not provide accurate and complete answers to properly determine the associated quality level that is being asked from the QAM. As a result, corresponding management decisions at both the project and test operation level might be more subjective than objective which may lead to insufficient or even wrong management actions.

SUMMARY

According to an embodiment, a test operation and reporting system is operable to evaluate testing of a SUT. The system includes a testing metrics selection engine executed by a computer system to identify core metrics included in a plurality of metric domains to evaluate a testing service level of one or more tests performed on the SUT. The plurality of metric domains include quality, productivity and cycle time, cost and effort, and testing maturity. The testing metrics selection engine identifies at least one non-core metric to evaluate the testing service level. A metrics compilation module determines measurements for the core metrics for the plurality of metric domains and for the at least one non-core metric. A trend generator determine a trend from the measurements. A trend evaluation module determines whether the trend meets an associated target and identifies a metric indicator and at least one other metric to explain the trend if the associated target is not met. A dashboard engine receives selections including a metric domain selection from the plurality of domains, a project release, and a test phase. The dashboard engine generates a plurality of views based on the selections, wherein the plurality of views are operable to include the trend, the associated target, the core metrics associated with the selected metric domain, the at least one optional metric, the metric indicator and the at least one other metric.

According to another embodiment, a method of evaluating test operation service delivery of an SUT includes identifying core metrics included in a plurality of metric domains to evaluate a testing service level of one or more tests performed on the SUT. The plurality of metric domains include at least some of quality, productivity and cycle time, cost and effort, and test operation maturity. The method further includes identifying at least one non-core metric to evaluate the testing service level; determining measurements for the core metrics for the plurality of metric domains and for the at least one non-core metric; determining a trend from the measurements; determining, by a computer system, whether the trend meets an associated target; identifying a metric indicator and at least one other metric to explain the trend if the associated target is not met; receiving selections including a metric domain selection from the plurality of domains, a project release, and a test phase; and generating a plurality of views based on the selections. The plurality of views may include the trend, the associated target, the core metrics associated with the selected metric domain, the at least one optional metric, the metric indicator and the at least one other metric. The method may be embodied by machine readable instructions stored on a computer readable medium, that when executed by a computer system, perform the method.

BRIEF DESCRIPTION OF DRAWINGS

The embodiments of the invention will be described in detail in the following description with reference to the following figures.

FIG. 2 shows definitions and descriptions for core metrics of the Test Metric Framework (TMF), according to an embodiment;

FIG. 3 shows definitions and descriptions for optional metrics of the TMF, according to an embodiment;

FIG. 4 shows metric clusters within the TMF, according to an embodiment;

FIG. 5 shows core metrics and optional metrics in reference to the metric domains of the TMF, according to an embodiment;

FIG. 6 shows core metrics and optional metrics in reference to test phases and stages of the project life cycle, according to an embodiment;

FIG. 7 shows core metrics and optional metrics in reference to trend perspectives and test operations, according to an embodiment;

FIGS. 8-12 show examples of screenshots of the TORS, according to embodiments;

DETAILED DESCRIPTION OF EMBODIMENTS

Figure 1:
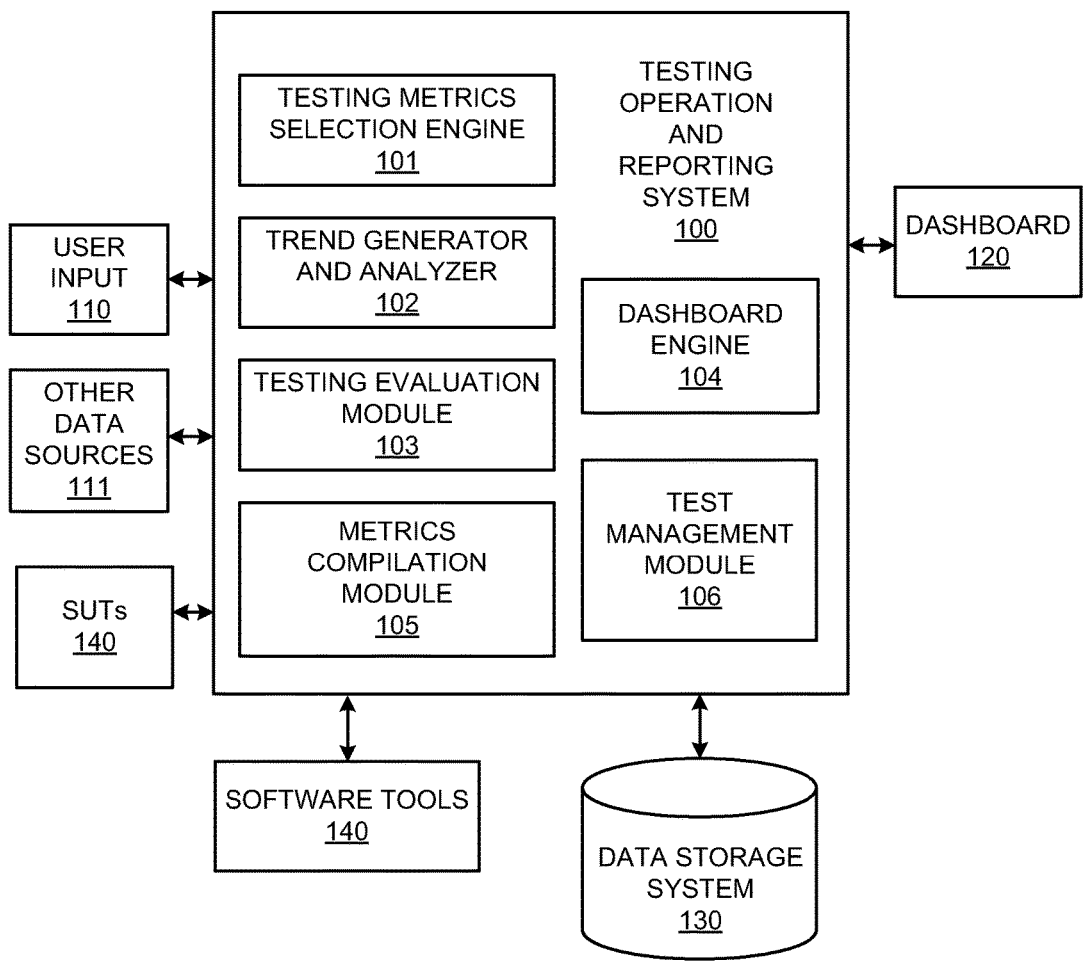
FIG. 1 illustrates a block diagram of a test operation and reporting system (TORS), according to an embodiment.

For simplicity and illustrative purposes, the principles of the embodiments are described by referring mainly to examples thereof. Also, the embodiments may be used in combination with each other. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments. Also, the embodiments described herein may be used with each other in various combinations.

1. Overview

According to an embodiment, the TORS provides a test management tool that may be used to evaluate testing of SUTs across a variety of industries and correlated lines of businesses, across different project life cycle phases and associated levels/stages of testing, across different metric domains, and across different types of SUTs. The TORS utilizes a core set of metrics as well as optional metrics for test-related operational measures. These metrics may be used for evaluating the level of testing services including, but not limited to, defect resolution tracking and management, testing maturity evaluation, budgetary and milestone tracking, return on investment (ROI), and tracking resource capacity against both the work demand and corresponding contractual obligations, such as agreed upon in a statement of work.

The TORS also provides a dashboard that offers a comprehensive, plug'n play, capability that reports on test service delivery operations that span from various project test phases to maturity assessment scores, and also covers resource demand and capacity management trends, customer satisfaction scores, and a test operation mobilization status to reach a steady state testing service operation. Global metrics, definitions, and all other metrics may be viewed through a single dashboard presenting information for operations, transition, demand, and testing units.

The TORS as well as the views generated in the dashboard provide a technical effect, for example, by way of an improved man-machine interface that significantly saves time and resources to explain trends. For example, the dashboard can generate views to include a trend, associated targets for the trend, core metrics, optional metrics, other metrics and a metric indicator that explain why a trend has failed to meet associated targets. Also, a metric cluster can be displayed in the dashboard to provide a correlated view of measurements of the metrics in the metric cluster to indicate correlations between the metrics that are operable to explain the trend. Without such views, it would be difficult to identify causes of trends, which can lead to poor management decisions at both the project and test operation level. Through these views, causes of the trends can be identified and fixed to improve testing service levels.

2. System

FIG. 1 illustrates the TORS 100, according to an embodiment. The TORS 100 includes testing metrics selection engine 101, trend generator and analyzer 102, testing evaluation module 103, dashboard engine 104, metrics compilation module 105, and test management module 106. The TORS 100 may include or be connected to data storage system 130 storing any measurement data used by the TORS 100. The data storage system 130 may include a database or another type of data storage system that is operable to store and retrieve data.

The TORS 100 may receive data from users, shown as user input 110, other data sources 111 and software tools 112 in a manual, semi-automated or automated manner. The user input 110 may include partial or full information about SUTs, such as test metric requirements, information for metric selection and any other user input that may be used by the TORS 100 for associated testing services and evaluations of testing services. The other data sources 111 may include data from other metric data sources and systems that may be used for trend analysis and benchmarking. The software tools 112 may include test management and automation tools that extract related test metric measurement data associated with one or more SUTs 140. This data may include measurements for core metrics, optional metrics, metric clusters, measurements for the metrics, testing data and other information. The core metrics, optional metrics, and metric clusters are described in further detail below. The TORS 100 uses these metrics to evaluate testing service level performance across different projects, releases, business units, test phases, test levels, metric clusters and metric domains. The SUTs 140 may include software applications, IT solutions or any type of system or software that is being implemented or has been implemented. The different test levels may include a project/release level whereby the SUT is being tested prior to implementation into a production environment. Another level may include a test operation unit level which may include testing of an SUT that is being used in a production environment. The different test phases may associated with the system development lifecycle (SDLC) test phases which include plan, analyze design, build, test and deploy of any kind of IT solution delivery methods, such as waterfall, iterative or agile. The SDLC is a conventional model, also referred to as the V-Model, commonly used to describe standard stages of IT solution and system development effort. The different metric domains include quality, productivity, cycle time, cost, effort and test operation maturity.

The TORS 100 generates a dashboard 120 that provides comprehensive information about the test service levels provided and/or managed by a test operation unit. A test operation unit may include one or more individuals and/or testing tools used by the individuals. The dashboard 120 is operable to generate and display reports for the different business units, the different test phases, and the different test levels within the different metric domains based on the core metrics, optional metrics and the associated metric clusters. Also, the dashboard 120 may present trends and information for evaluating trends related to defect management, ROI, customer satisfaction, test maturity, etc. Examples of displays for the dashboard 120 are described below.

The testing metrics selection engine 101 identifies core metrics and optional metrics to be used to evaluate test service levels of one or more associated SUTs. In one embodiment, the core metrics are selected and then one or more optional metrics are selected based on user input.

The trend generator and analyzer 102 generates trends to evaluate testing services. The trend generator and analyzer 102 also compares metrics to thresholds targets and performs benchmarking. Benchmarking allows metrics and trends for an SUT to be compared against other SUTs within the same test operation unit or across different business units of an enterprise. Data gathered from the other sources 111 may include metrics from other SUTs that can be used for benchmarking.

The testing evaluation module 103 evaluates metrics and trends and compares them against associated targets. The testing evaluation module 103 also identifies related metric clusters which may be used to answer questions regarding testing service performance and trends identified by the trend generator and analyzer 102. For example, if the trend indicates that testing defects are increasing or not improving over time, one or more metric clusters associated with the trend are identified by the testing evaluation module 103, and these metric clusters are used to explain the causes of the trend. For example, a metric cluster for defect productivity is identified by the testing evaluation module 103 and used to explain potential causes for a poor defect resolution trend.

The dashboard engine 104 generates the dashboard 120, including the various reports that may be viewed by users via the dashboard 120. The dashboard 120 may include a graphical user interface (GUI) that allows user interaction.

The dashboard 120 may be web-based. A user may select different options in the dashboard 120 so that the desired information is presented to the user in a clear and concise manner.

The metrics compilation module 105 gathers test data including measurements for the core metrics, optional metrics and metric clusters. The test data may be gathered by the software tools 112, the other data sources 111 and/or from user input 110. This data is stored in the data storage system 130. The metrics compilation module 105 may perform calculations on the data to determine values for the metrics.

The test management module 106 manages metrics that are associated with the test operation at an organizational unit level. Testing services that may be supported by the TORS may include functional testing, e.g., system testing, acceptance testing and overall test management, as well as technical testing, e.g. performance testing, SOA testing and test automation.

Other testing services supported by the TORS 100 and managed by the test management module 106 may include defect resolution, test maturity assessment, ROI assessments, customer satisfaction and resource capacity management. Defect resolution may include tracking fix backlog trends, retest backlog trends and defect closure trends to determine if defects and test failures are being resolved in an expected timely manner. Test maturity assessment verifies whether maturity targets are achieved by a test operation and organization over a period of time, for example, quarterly, annually, etc. Test maturity is the measure of the ability of testing procedures to provide proper testing of software or other types of SUTs. Resource capacity management may include the verification of whether agreed upon contractual full-time equivalent (FTE) resource capacity, the actual/ forecasted FTE resource capacity and the amount of work (demand of service requests) meet expected targets to enable an effective and efficient test operation and its associated test service delivery.

3. Core Metrics, Optional Metrics, Metric Clusters

The core metrics are a set of metrics that are expected to be used for all types of SUTs. The core metrics support test service delivery management. In one embodiment, all the core metrics are measured for all SUTs and in other embodiments one or more of the core metrics are used for each SUT. The core metrics include the following: Test Artifact Development Trend, Test Artifact Execution Trend, Test Artifact Pass Trend, Defect Age, Fix Backlog Trend, Retest Backlog Trend, Defect Closure Trend, Defect to Artifact Trend, Cost of Poor Quality (Rework), Defect Removal Effectiveness, and Artifact Sign-off Status.

Table 1 shown in FIG. 2 provides definitions and descriptions for each of the core metrics of the Test Metric Framework (TMF). The TMF, for example, includes the core metrics, optional metrics and metric clusters described herein. In particular, table 1 defines, for each metric, a new metric title as used in the TMF, and an alternative title that refers to names for the same metric that may be used by other parties. Also provided for the metrics are definitions (formulas), descriptions, purpose and objectives, trend indicators, corrective and preventative actions based on trends, recommended targets and a metric cluster grouping reference numbers.

The metrics purpose describes the objectives of each metric. The trend indicator provides an example of causes for an unfavorable measurement trend. The corresponding corrective and preventative actions describe activities that assist the QAM with recommendations of managing such unfavorable trends. For example, the core metric Test Artifact Development Trend is related to the productivity and efficiency of the testing team as described in its purpose. This metric may indicate that the trend is unfavorable due to insufficient resource capacity or unmanaged test scope changes. If so, the testing evaluation module 103 shown in FIG. 1 may present corrective and prescriptive actions for the metric to the user via the dashboard 120. In this case, the actions may suggest to adjust test team resource capacity according to skills and experience and to start measuring actual against a planned target.

Also shown in table 1 are examples of recommended targets and a metric cluster reference to which the metric logically belongs. The recommended targets are thresholds in reference to leading testing practices for each metric. The testing evaluation module 103 may determine whether the threshold is met for the metric. If not, the corresponding metric cluster is reviewed to identify why the threshold was not met. For example, if the Test Artifact Development Trend is <90% per predetermined time period, the metrics in cluster 1 are evaluated. All the data shown in table 1 and other tables shown in the figures may be stored in the data storage system 130 and used by the TORS 100.

Table 2 shown in FIG. 3 lists the optional metrics of the TMF. Table 2 includes the same fields as table 1. The optional metrics include the following: Acceptance Backlog Trend, Triage Backlog Trend, Defect Arrival Trend, Defect Re-Open Trend, Defect to Size Trend, Requirement Fix Trend, Requirement Volatility, Test Coverage, Cost of Quality, Script Execution Time, Test Automation Penetration, Phase Exit Trend, Root Cause Trend, Budget Adherence, Earned Value Trend, Schedule Adherence, Artifact Review Effectiveness, On-/Offshore Resource Ratio, Risk-Based Testing Score, Test Data Timeliness, Test Downtime, Test Maturity Level, Test Investment ROI, Customer Satisfaction, Defect Rejection Trend, Operation Transition Status, and Operation Capacity Status.

The optional metrics are metrics that may provide, in addition to the core metrics, an even more balanced understanding of the quality and effectiveness of testing services. The test metric selection engine 101 shown in FIG. 1 may select one or more optional metrics depending on factors such as the level of testing service being provided, the metric domain, or the test phase/stage. The user may select optional metrics that are more applicable to their SUT and test services. Also, the test metric selection engine 101 may make recommendations to the user for optional metrics to select based on the factors.

Table 3 in FIG. 4 lists the metric clusters of the TMF. Each TMF metric has been mapped to one of 12 metric clusters. They can be used as a key entry point into the framework and also direct the QAM to a proper logical grouping to drive proper and comprehensive reporting. The metric clusters include Test Artifact Management, Defect Productivity, Defect Extended Management, Defect Density, Test & Requirement Coverage, Cost of Testing, Test Process Productivity, Phase/Stage Containment, Cost/ Schedule/PPM, Maturity, Operation Transition Management, and Operation Capacity Management.

Table 3 lists the cluster number which corresponds to the cluster field shown in tables 1 and 2 of FIGS. 2 and 3. For example, metric cluster 1 includes the core metrics Test Artifact Development Trend, Test Artifact Execution Trend, Test Artifact Pass Trend and the optional metric Artifact Review Effectiveness identified as logically belonging to cluster 1 from tables 1 and 2. Table 3 in FIG. 4 also lists the corresponding metrics for each metric cluster and indicates whether each metric is a core metric. In addition, Table 3 identifies a key question associated with each metric cluster as well as a cluster description and objective. The key question is an example of the question that the metric cluster may be used to answer by the QAM. For example, metric cluster 1 is Test Artifact Management. The key question for metric cluster 1 is, "How well does the test operation manage test scope in correlation to the IT solution quality?" This question may be asked by the QAM if one or more of the metrics for metric cluster 1 do not meet their expected performance, which may be based on a threshold comparison. The metrics in metric cluster 1 are then viewed together via the dashboard 120 of FIG. 1 to determine potential correlated causes of why the test operation is not managing the test scope in reference to an overall SUT solution quality as expected. The purpose and description of metric cluster 1 is also provided and includes, "TMF Metric Cluster focuses on a test operation's ability to effectively manage test artifacts, such as test scenarios, test cases, or test scripts during test preparation and test execution for every test phase of a SDLC. It helps test leads prioritizing the work effort allocation, manage test scope, and obtain an indication of the quality of the IT SUT."

The testing evaluation module 103 shown in FIG. 1 may identify a metric cluster for any metric selected by the testing metric selection engine 101 not satisfying expected service performance. The testing evaluation module 103 may then display the metrics for the metric cluster via the dashboard 120 to aid in evaluating why expected performance was not satisfied. Examples of the displays are provided below. Also, the key question associated with the metric cluster may be presented to the user via the dashboard 120 for the user to select a metric cluster.

The core metrics, optional metrics and metric clusters described above are one embodiment of metrics that may be used to evaluate the level of testing services at both the project and test operation level. In other embodiments, different sets of metrics may be used for core metrics, optional metrics and metric clusters.

Testing operations may focus primarily on why a particular IT SUT failed testing, however, testing operations typically do not focus on other testing factors that may impact testing. According to an embodiment, the testing metrics selection engine 101 shown in FIG. 1 is operable to categorize core and optional metrics in four metric domains. The metric domains comprise Quality, Productivity/Cycle Time, Cost/Effort, and Test Maturity. These metric domains represent categories that allow educated QAM decisions to be made regarding test service delivery. Table 4 in FIG. 5 maps the core metrics and optional metrics for each metric domain.

The quality domain represents the degree to which a SUT meets business and end-user needs and the degree to which end-user/business confidence and satisfaction of the SUT is obtained. The Productivity/Cycle Time domain represents the level of efficiency demonstrated by a test organization or test operation unit to deliver a SUT. The Cost/Effort domain represents the amount of work done (e.g., in terms of man hours for testing) and level of actual investment made related to testing. The Test Maturity domain represents the level of reliability of test operations to deliver test services effectively according to agreed upon service levels.

The testing metrics selection engine 101 shown in FIG. 1 is also operable to categorize core and optional metrics by testing phase, trend perspective, and test operation perspective. The different test phases may include the SDLC, or project, test phases which include plan, analyze, design, build, test and deploy. Table 5 in FIG. 6 maps the core metrics and optional metrics to each test phase, and Table 6 in FIG. 7 maps the core metrics and optional metrics to each trend perspective, and test operation perspective.

Trend perspective categories include In-Progress (Leading) and Post-Release (Lagging). In-Progress (Leading) represents metrics measured during project delivery that provide facts that can aid decisions to correct negative trends, such as an increase in defects by severity over time. Post-Release (Lagging) represents metrics measured after project delivery that provide facts that can aid corrective decisions for future engagements. The dashboard 120 allows both trend perspectives to be analyzed so proactive actions may be taken.

The test operation perspective levels may include a project/release level and a unit operation level. The project/release level measures the SUT as one distinct service delivery. The unit operation level measures the test service performance across multiple SUTs. For example, a Testing Center of Excellence (TCoE) as the unit operation level delivers test services to multiple SUTs across multiple lines of business. As a result, the customer satisfaction scores show the feedback that the TCoE has received from each of the SUT key test stakeholders.

The testing metrics selection engine 101 is operable to categorize the core and optional metrics into any of the categories described above. Also, these categories may be used to select core and optional metrics to view via the dashboard 120. These categories and their corresponding metrics may be displayed to the user and user may select a category for display.

4. Examples of Screenshots

Figure 8:
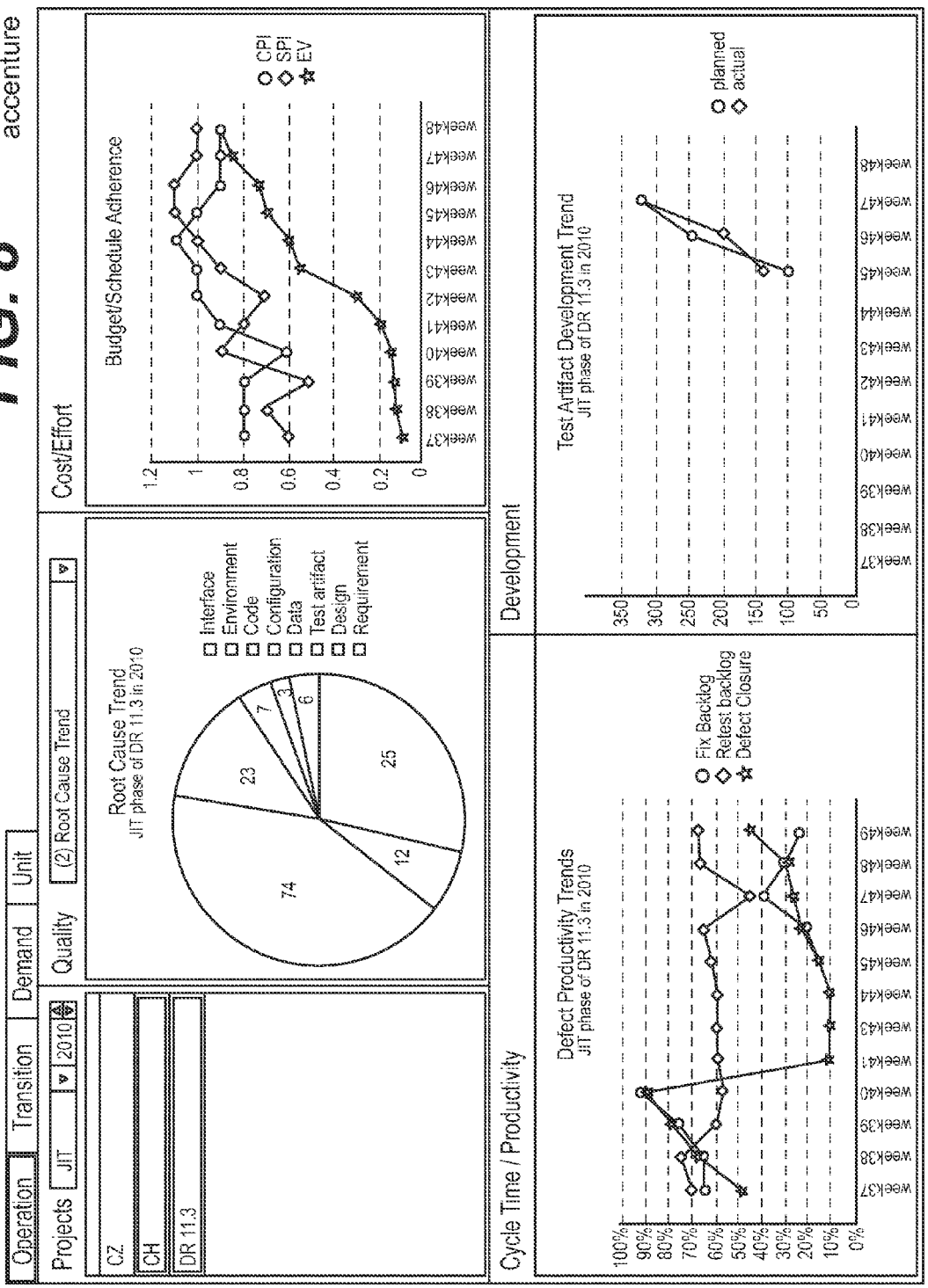

FIGS. 8-12 show examples of screenshots that may be generated by the dashboard engine 104 in the dashboard 120. FIG. 8 shows a screenshot of the dashboard including the metric domains of Quality, Cost/Effort and Productivity/Efficiency. The release and test phase may be selected in windows. Also, different metrics under each domain that they are associated with may be selected by the user for viewing in the corresponding section of the screen. Some of the metrics may be shown in associated twelve week rolling calendar timeframe.

Figure 9:
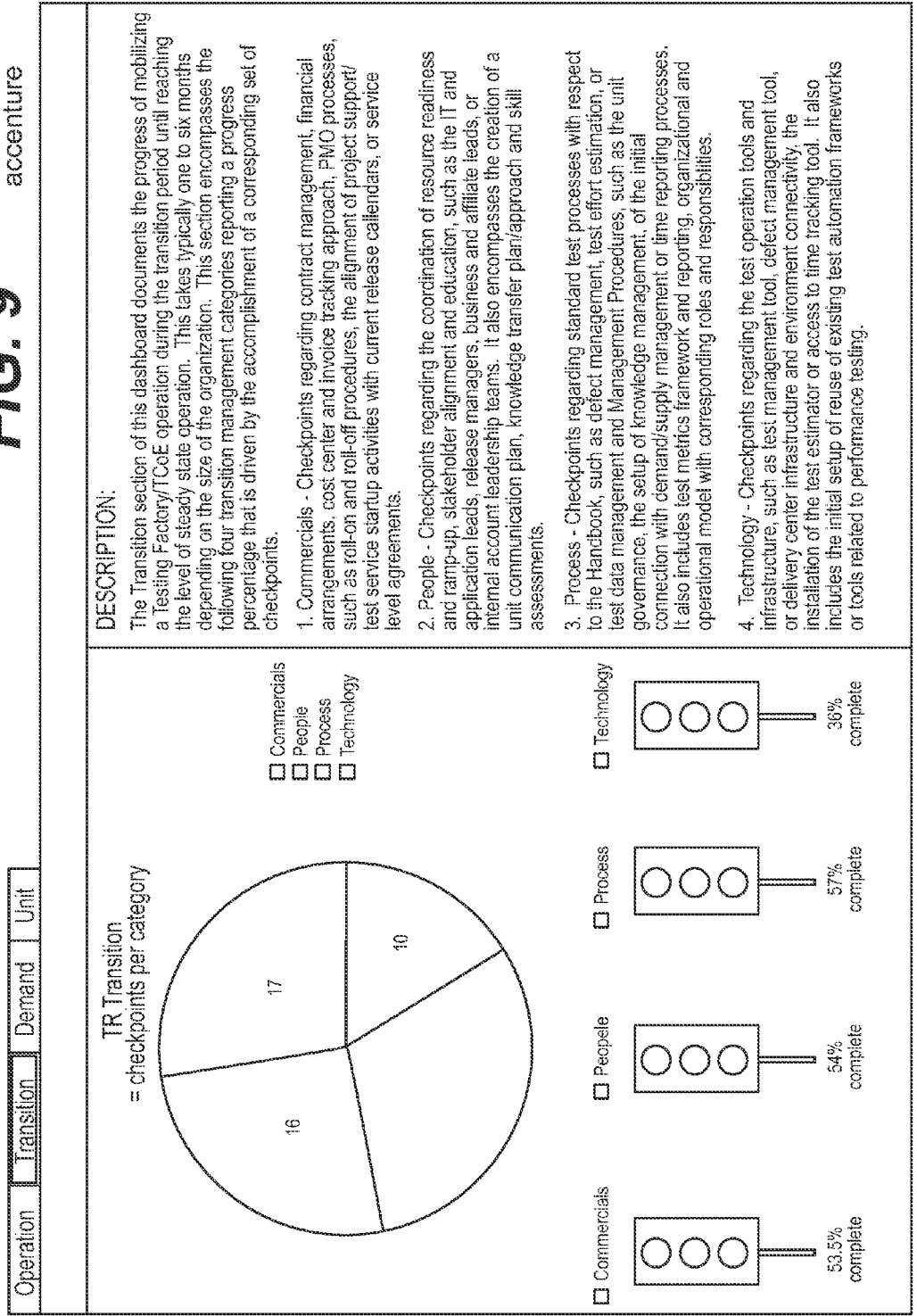

FIG. 9 shows a screenshot representing metrics for test operation transition. Transition is associated with the documenting of the progress of mobilizing a testing operation during the transition period until reaching the level of steady state operation. The length of the transition period may depend on the size of the organization. This transition is represented by the four transition management categories, as following described in detail, reporting a progress percentage that is driven by the accomplishment of a corresponding set of checkpoints.

Commercials includes checkpoints regarding contract management, financial arrangements, cost center and invoice tracking approach, PMO processes, such as roll-on and roll-off procedures, the alignment of project support/test service startup activities with current release calendars, or service level agreements.

People includes checkpoints regarding the coordination of resource readiness and ramp-up, stakeholder alignment and education, such as the IT and application leads, release managers, business and affiliate leads, or internal account leadership teams. It also encompasses the creation of a unit communication plan, knowledge transfer plan/approach and skill assessments.

Process includes checkpoints regarding test processes, such as defect management, test effort estimation, or test data management, and regarding management procedures, such as the unit governance, the setup of knowledge management, of the initial connection with demand/supply management or time reporting processes. Process may also include organizational and operational models with corresponding roles and responsibilities.

Technology includes checkpoints regarding the test operation tools and infrastructure, such as a test management tool, a defect management tool, a delivery center infrastructure and connectivity, a test estimator tool, and a time tracking tool. Technology may also include the initial setup or reuse of existing test automation framework or tools related to performance testing.

FIGS. 10A-C show a screenshot representing test operation resource and demand capacity management. FIGS. 10A-C show trends for the test operation Base Capacity, Actual Capacity and Demand Capacity. Capacity refers to the resource capacity of a test operation unit to manage Full Time Equivalent (FTE) supply against the service demand. Base Capacity represents the contractual agreed upon resource capacity over the period of a rolling twelve month calendar timeframe. Actual Capacity is the current capacity representing the actual number of currently employed FTE of the test operation unit. Demand Capacity shows the FTE equivalent of the service demand (workload) that is projected to be placed on the test operation unit. These trends may be used to manage the resource capacity of the test operation unit against the work demand and against a corresponding statement of work.

Figure 11:
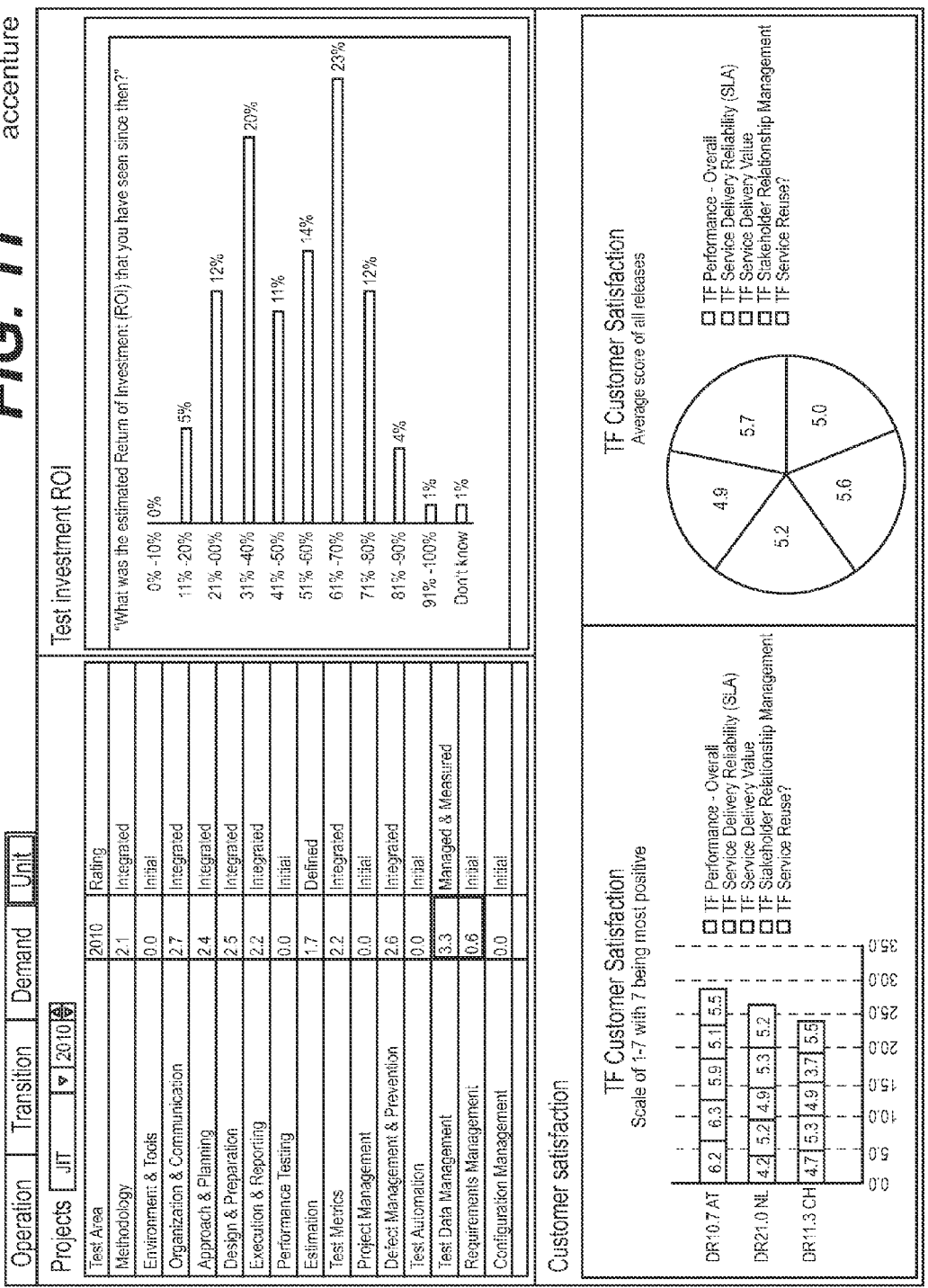

FIG. 11 shows a screenshot representing metrics for the test operation unit level. The metrics may include metrics for Test Maturity, ROI and Customer Satisfaction.

Figure 12:
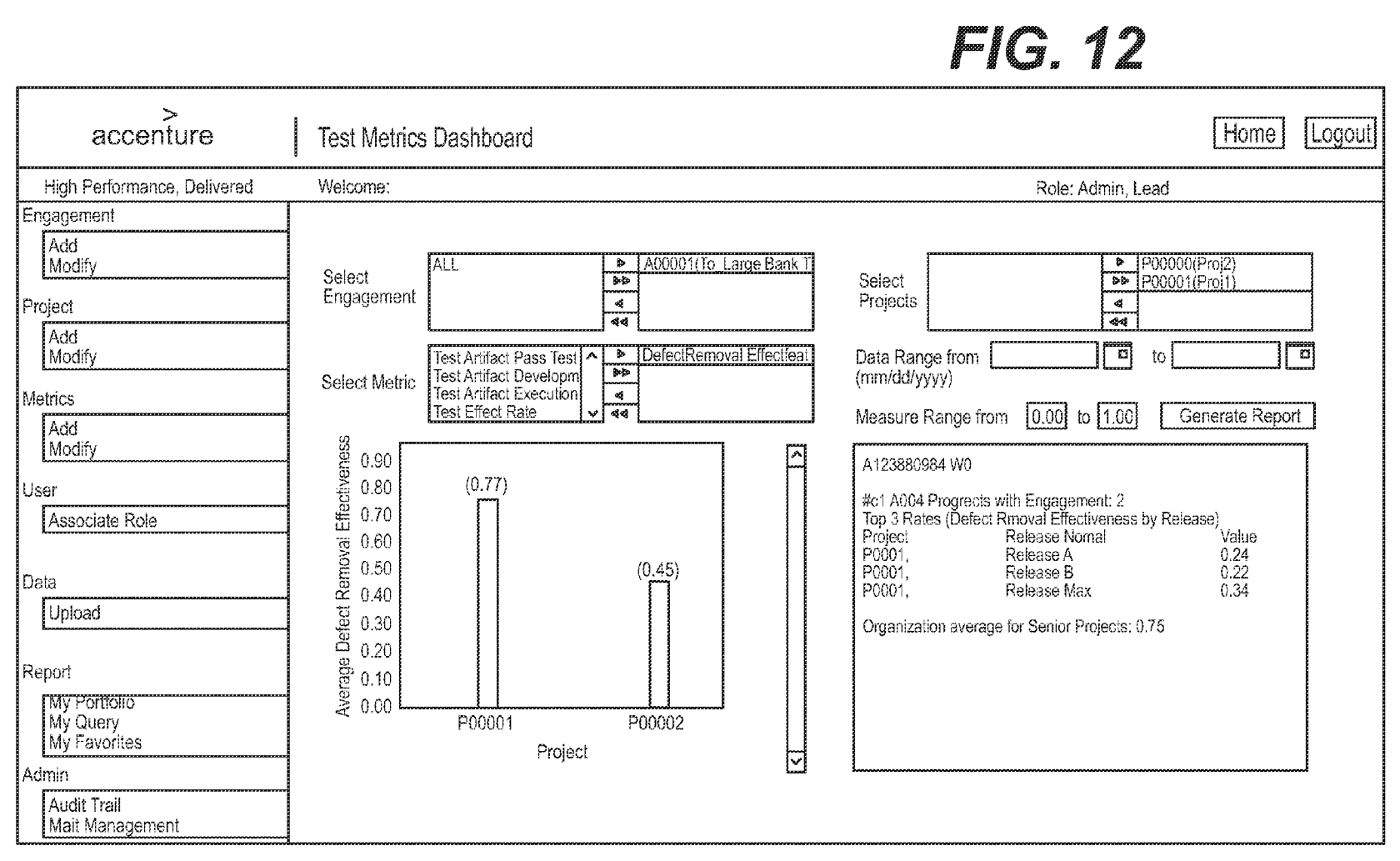

FIG. 12 shows a screenshot representing benchmarking that is associated with the metrics that are captured for TORS. It shows in the example trending measurements for the Defect Removal Effectiveness (DRE) metric comparing multiple releases and projects of the same test operation unit. It also provides additional information, such as the distinct actual DRE values for each release and project so that the reviewer, such as the test operation lead, obtains an actual picture of the test operation service performance of his/her unit.

5. Methods

Figure 13:
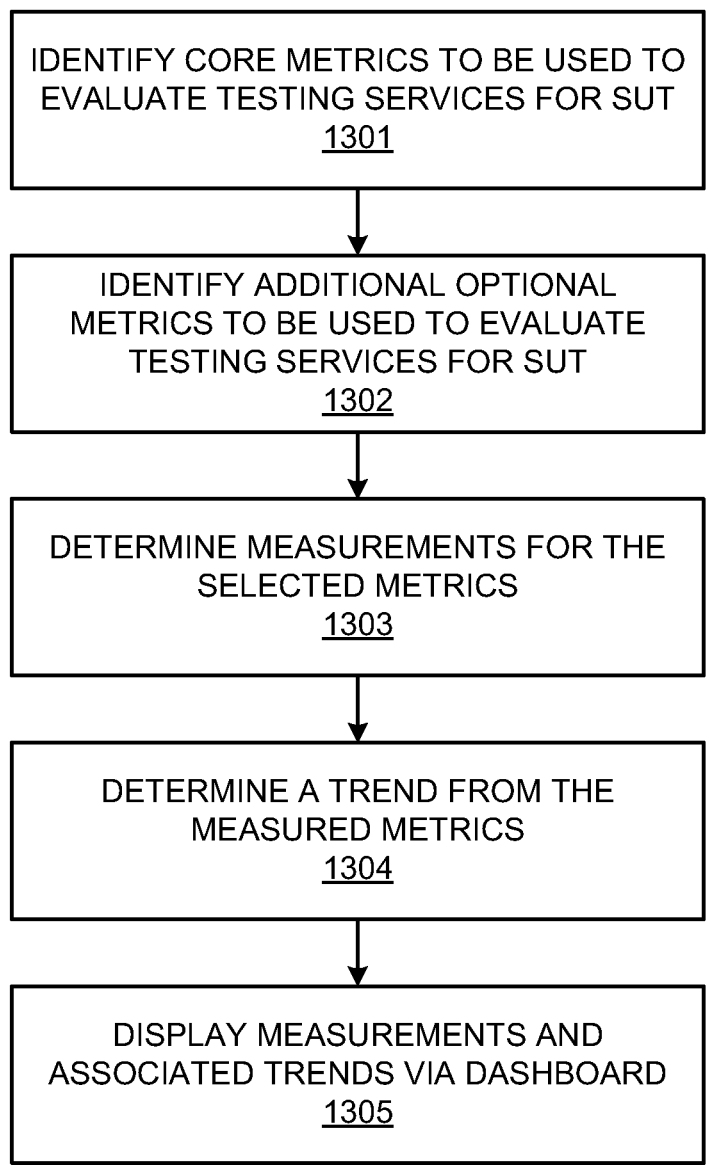
FIGS. 13-14 illustrate flow charts of metric management methods, according to embodiments.

FIG. 13 illustrates a flowchart of a method 1300, according to an embodiment. The method 1300 and method 1400 discussed below are described with respect to the TORS 100 shown in FIG. 1 by way of example and not limitation. The methods may be practiced in other systems.

At step 1301, the testing metrics selection engine 101 identifies core metrics to be used to evaluate testing service levels of an SUT. The testing may include any type of test services performed on an SUT and any other services associated with testing and quality assurance. A testing service level is the level of performance of the testing operations unit providing the testing service, which may be measured by one or more of the metrics described herein. The testing service level may be compared to expected performance. Information, such as the calculation formulas, metric cluster or associated measurement thresholds, for the core metrics and any other metrics used by the TORS 100 is stored in the data storage system 130, and the testing metrics selection engine 101 may identify the core metrics by the metric information as stored in the data storage system. In one embodiment, the testing metrics selection engine 101 may retrieve the listing and descriptions of the core metrics, such as shown in table 1 in FIG. 2, and present the information to a user via the dashboard 120. The user may verify the core metric selection or modify the selection.

At step 1302, similar to step 1301, the testing metrics selection engine 101 identifies one or more optional metrics to be used to evaluate the testing service levels. In one embodiment, the testing metrics selection engine 101 may retrieve the listing and descriptions of the optional metrics, such as shown in table 2 in FIG. 3, and present the information to a user via the dashboard 130. The user may select the optional metrics.

According to an embodiment, at steps 1301 and 1302, the testing metrics selection engine 101 selects both the core and optional metrics according to predetermined categories. The categories, for example, include metric domains, test phases, metric clusters, trend perspectives and test levels, such as shown in FIGS. 4-7. The user may select a category and then the core and optional metrics in the category are selected. In one embodiment, the testing metrics selection engine 101 may select the category depending on information determined for the testing services. For example, the phase of the SUT is tracked. The testing metrics selection engine 101 selects the metrics corresponding to the current test phase. Metrics may also be selected based on the type of SUT. In another embodiment, the testing metrics engine 101 may select the metrics as pre-determined by the metric cluster, such as shown in FIG. 8 with regard to the Fix Backlog Trend, the Retest Backlog Trend, and the Defect Closure Trend are shown in own window under the Productivity domain.

At step 1303, the metrics compilation module 105 determines measurements for the selected metrics identified in steps 1301 and 1302. The measurements may be actual measurement values or calculated values determined from the actual measurements according to formulas. Examples of the formulas are shown in FIGS. 2 and 3 in the definitions field. Examples of actual measurements include 13 for number of defects or 10 days for age of a defect. The measurements are stored in the data storage system 130. The measurements may be taken by the TORs or retrieved from data sources other than TORS, such as financial systems for cost metrics or project management and time tracking tools for actual hours of a workplan task executed.

At step 1304, the trend generator and analyzer 102 calculates a trend from the metric measurements. Examples of trends may include a Test Artifact Pass Trend, Budget Adherence trends, Defect Productivity Trends, and Test Artifact Execution Trends. The trends may include the metric measurements/formulas calculations plotted over time, such as a 12-week rolling calendar timeframe, based on scoring values derived from the measurement calculations. For example, budget adherence may be plotted based on a scale between 0 and 1.2. The actual budget metric value, such as the Cost Productivity Indicator (CPI), may indicate that a project is currently over, at or under budget.

At step 1305, the trends are displayed via the dashboard 120. The dashboard 120 is a modifiable display that allows the user to select from the set of metrics stored in the data storage system 130. In one embodiment, the dashboard engine 104 organizes the metrics according to the categories and clusters described above and in the screenshots described above to organize data in a way that is amicable to the reviewer of metric trends to assist with a fact-based decision-making process.

Figure 14:
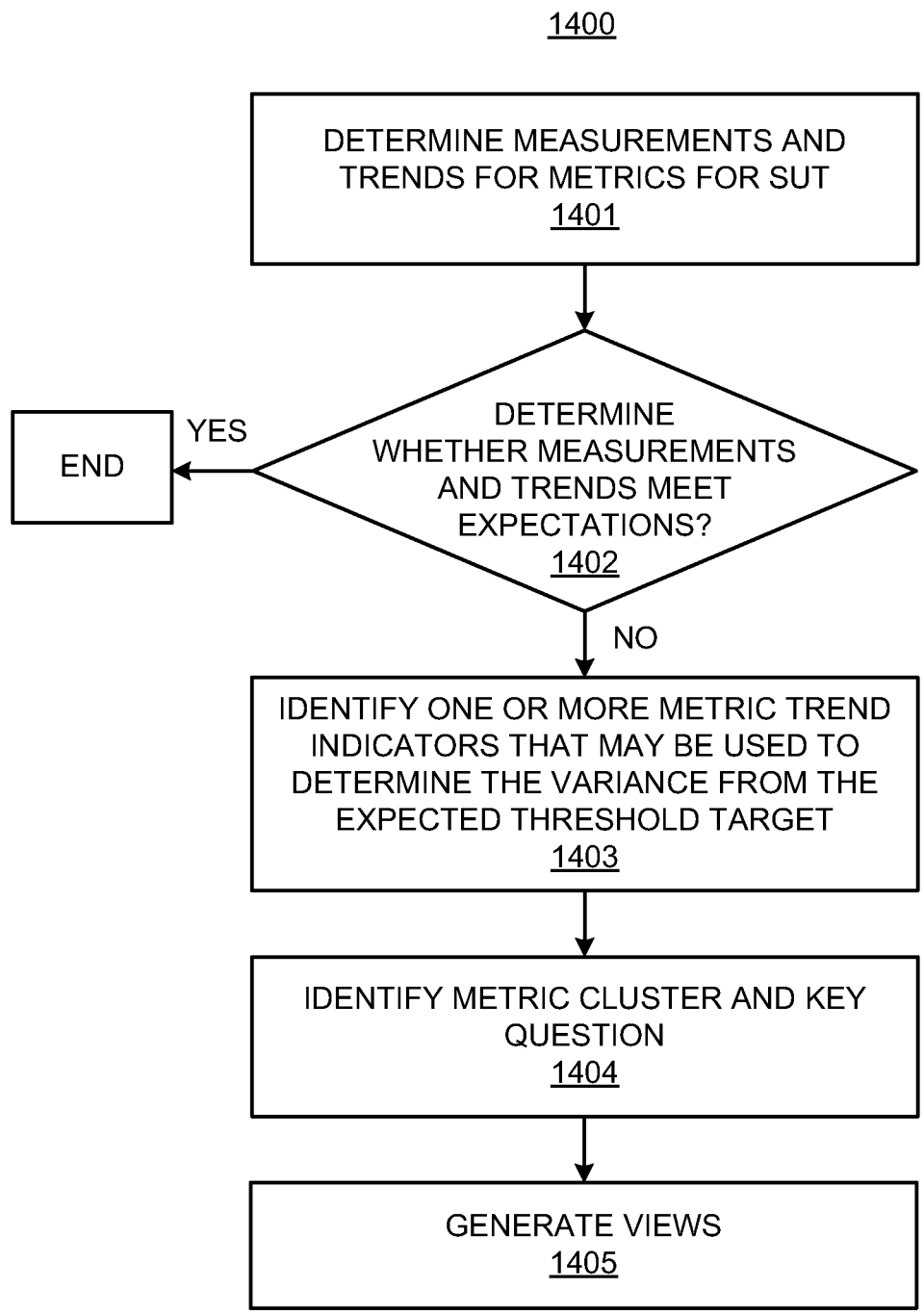

FIG. 14 illustrates a flowchart of the method 1400, according to an embodiment, for evaluating the trends and measurements for metrics for an SUT. At step 1401, the trend generator and analyzer 102 determines measurements and trends for metrics for an SUT. The step 1401 may be performed by one or more of the steps of the method 1300.

At step 1402, the trend generator and analyzer 102 determines whether the measurements and trends meet expectations. For example, the trend generator and analyzer 102 may compare the measurements and trends to associated thresholds. Table 1 in FIG. 2 discloses examples of thresholds under recommended targets. The trend generator and analyzer 102 may perform benchmarking, which includes comparing the measurements and trends to measurements and trends for other SUTs that may be related to the actual SUT. The trend generator and analyzer 102 determines whether the trend is outside of a tolerance based on the associated threshold, such as +−4% from the average of the metrics for the related SUTs. The associated thresholds may be determined by benchmarks from internal the test operation, from an enterprise, from an industry, from a line of business, or other factors.

At step 1403, if the measurements and/or trends do not meet associated thresholds (e.g., outside tolerances or greater than or less than the threshold depending on the type of threshold), then the testing evaluation module 103 identifies one or more trend indicators and other metrics that may be used to explain why the trend fails to meet benchmarks. For example, the test artifact development trend is a core metric in metric cluster 1, such as identified in FIG. 2 and FIG. 4. If the Test Artifact Development trend falls below a predetermined threshold (e.g., <90%), the testing evaluation module 103 identifies the trend indicator to explain the failure to meet the threshold. In this example, the trend indicator in FIG. 2 for Test Artifact Development trend states, "Trend is unfavorable due to insufficient resource capacity or unmanaged test scope changes." Also, metrics and their measurements associated with the trend and the trend indicator are determined and further monitored over time to determine if the trend indicator is accurate and to explain the trend. For example, the trend indicator identifies insufficient resource capacity or unmanaged test scope changes as possible causes to explain the trend. Resource capacity and management of test scope changes are the metrics that are determined. The measurements for these metrics are also determined and further monitored to determine whether these metrics are the cause of the trend. Other metrics that are monitored to explain the trend are the number of artifacts developed and the number of artifacts planned to be developed. These metrics are used to calculate the Test Artifact Development trend as described in FIG. 2. The measurements for these metrics are determined to see if they are consistent with benchmarks, which may be used to explain the trend. For example, if the number of artifacts planned to be developed is too high when compared to benchmarks, then this explains the failure of the trend to meet the threshold.

At step 1404, the testing evaluation module 103 identifies a metric cluster and key question associated with the metric cluster and the measurements and/or trends that do not meet the associated thresholds. Each of the core metrics and the optional metrics are associated with a metric cluster as shown in FIGS. 2-4. The data storage system 130 may be queried to identify the associated metric cluster and key question for the failed metric or trend. The key question is an example of a question that the metric cluster may be used to answer. For example, metric cluster 1 is Test Artifact Management. The key question for metric cluster 1, as shown in FIG. 4 is, "How well does the test operation manage test scope in correlation to the IT solution quality?" This question may be asked by the QAM if one or more of the metrics for metric cluster 1 do not meet their expected performance, which may be based on a threshold comparison. The metrics in metric cluster 1 may then be viewed together via the dashboard 120 of FIG. 1 to determine potential correlated causes of why the test operation is not managing the test scope in reference to an overall SUT solution quality as expected, as described below.

At step 1405, the dashboard engine 104 generates one or more views to explain the trend in the dashboard 120. Examples of the views are described above and shown in the figures with respect to the screenshots. A view may include the trend and the other metrics described in steps 1403 and 1404. The view includes the measurements for the metrics and the associated trend. The dashboard engine 104 may also display other information stored in the data storage system 130 and associated with the metric trend, including the key question for the associated metric cluster, suggestive corrective actions for the metric cluster, and possible causes for not meeting expectations. In one example, the dashboard engine 104 generates a view of the metrics in the associated metric cluster (e.g., metric cluster 1) so the metrics can be viewed together via the dashboard 120. This view may be used to determine potential correlated causes of why the test operation is not managing the test scope in reference to an overall SUT solution quality as expected. The purpose and description of metric cluster 1 is also shown in the view. The methods 1300 and 1400 may be repeated over time to generate different views of both the relevant core metrics and optional metrics.

6. Computer System

Figure 15:
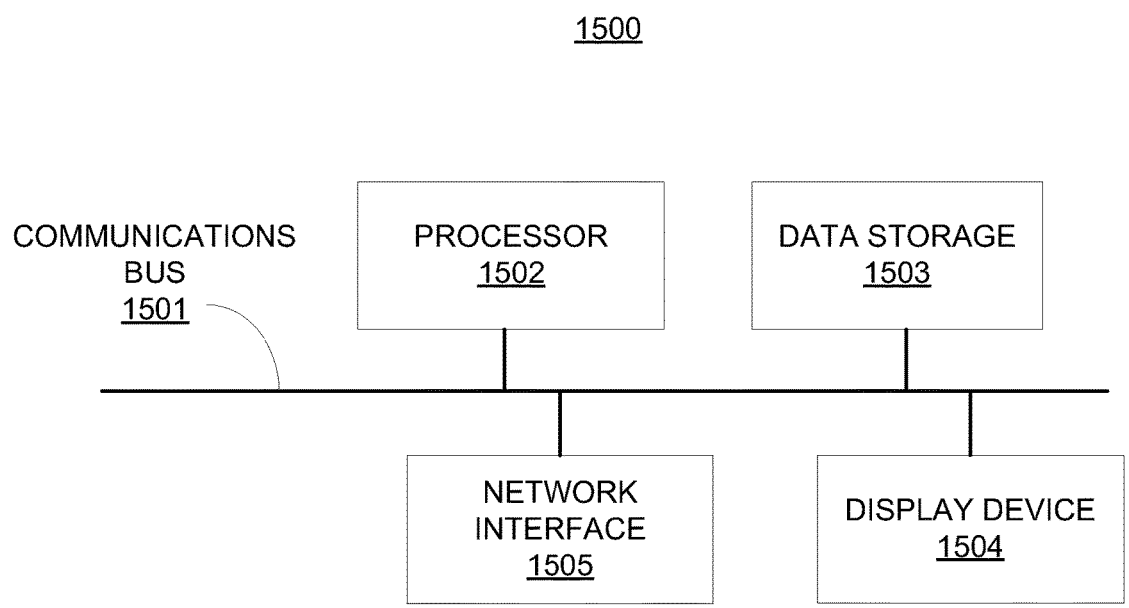
FIG. 15 illustrates a computer system, according to an embodiment.

FIG. 15 shows a computer system 1500 that may be used as a hardware and infrastructure platform for the TORS 100. The computer system 1500 may be used as a platform for executing one or more of the steps, methods, modules and functions described herein that may be embodied as machine readable instructions stored on one or more computer readable mediums. Thus, the components of the TORS 100 shown in FIG. 1 may be or may include software executed by a computer system. The computer readable mediums storing the machine readable instructions may be non-transitory, such as storage devices including hardware. The computer system 1500 may represent a server in one embodiment. The TORS 100 may be hosted on such hardware and infrastructure configuration or on a cloud computing system or another type of distributed computing system.

The computer system 1500 includes a processor 1502 or processing circuitry that may implement or execute software instructions performing some or all of the methods, modules, functions and other steps described herein. Commands and data from the processor 1502 are communicated over a communication bus 1501. The computer system 1500 also includes a computer readable data storage device 1503, such as random access memory (RAM), where the software and data for processor 1502 may reside during runtime. The storage device 1503 may also include non-volatile data storage. The computer system 1500 may include a network interface 1505 for connecting to a network. It will be apparent to one of ordinary skill in the art that other known electronic components may be added or substituted in the computer system 1500. The computer system 1500 may also includes a display device that, such as computer screen or TV-like device that may be used to display images resulting from TORS operation.

While the embodiments have been described with reference to examples, those skilled in the art will be able to make various modifications to the described embodiments without departing from the scope of the claimed embodiments.

What is claimed is:

1. A test operation and reporting system to evaluate testing of software, the system comprising:
a testing metrics selection engine executed by a computer system to
identify core metrics included in a plurality of metric domains to evaluate a testing service level of one or more tests performed on the software, wherein the plurality of metric domains includes testing maturity, which includes periodic targets for measuring an ability for testing of the software, and at least some of quality, productivity and cycle time, cost, and effort, and wherein the core metrics include a test artifact development trend, test artifact execution trend, test artifact pass trend, defect age, fix backlog trend, retest backlog trend, defect closure trend, defect to artifact trend, cost of poor quality, defect removal effectiveness, and artifact sign-off status, and
identify at least one non-core metric to evaluate the testing service level,
wherein each core and non-core metric is a member of at least one metric cluster of a plurality of metric clusters, each metric cluster having an associated different key question;
a metrics compilation module to:
determine measurements for the core metrics and the at least one non-core metric; and
extract test metric measurement data associated with at least one system under test (SUT), wherein the at least one SUT includes at least one of a software application and an information technology (IT) solution;
a trend generator to determine a trend from the measurements;
a trend evaluation module to:
determine whether the trend meets an associated target;
in response to a determination that the trend does not meet the associated target, determine a failed metric from the core metrics and the at least one non-core metric based upon the measurements for the core metrics and the at least one non-core metric associated with the trend,
identify a trend indicator to explain why the trend did not meet the associated target,
identify at least one other metric in the metric cluster associated with the failed metric,
identify the key question associated with the associated metric cluster, and
monitor the identified at least one other metric over time to confirm an accuracy of the trend and provide an associated corrective action for the trend, wherein the trend includes the test artifact execution trend, the test artifact pass trend, the defect age, the fix backlog trend, the retest backlog trend, the defect closure trend, the defect to artifact trend, the cost of poor quality, the defect removal effectiveness, the artifact sign-off status, and the test artifact development trend, and wherein the associated corrective action for the test artifact development trend includes adjusting a capacity of test team personnel according to skills and experience; and
a dashboard engine to receive selections including a metric domain selection from the plurality of domains, a project release, and a test phase, and to generate a plurality of views based on the selections, wherein the plurality of views include the trend, the associated target, the core metrics associated with the selected metric domain, the at least one non-core metric, the trend indicator, the key question, the at least one other metric, and the associated corrective action for the trend.

2. The system of claim 1, wherein the trend evaluation module compares the at least one other metric to a benchmark to explain the trend.

3. The system of claim 1, wherein the dashboard engine generates a correlated view of measurements of the metrics in the metric cluster in the dashboard, wherein the correlated view indicates correlations between the metrics in the metric cluster that explain the trend.

4. The system of claim 3, wherein the plurality of metric clusters comprises Test Artifact Management, Defect Productivity, Defect Extended Management, Defect Density, Test & Requirement Coverage, Cost of Testing, Test Process Productivity, Phase/Stage Containment, Cost/Schedule/PPM, Maturity, Operation Transition Management, and Operation Capacity Management.

5. The system of claim 1, wherein the trend generator scores the core metrics and the at least one non-core metric over time for each metric domain, and determines the trend for one or more of the metric domains based on the scored metrics.

6. The system of claim 1, wherein the testing metrics selection engine determines categories of metrics for the plurality of domains, for test phases, for trend perspectives, and for test levels, and the testing metrics selection engine identifies the core metrics and the at least one non-core metric based on a selection of one or more of the categories.

7. The system of claim 1, wherein the core metrics and the at least one non-core metric are metrics for evaluating defect tracking and management, testing maturity, budgetary and schedule tracking, return on investment (ROI), and resource capacity against work demand and against a corresponding statement of work.

8. The system of claim 7, wherein the system determines measurements for the core metrics for all-being evaluated.

9. The system of claim 1, wherein the at least one non-core metric comprises at least one of Acceptance Backlog Trend, Triage Backlog Trend, Defect Arrival Trend, Defect Re-Open Trend, Defect to Size Trend, Requirement Fix Trend, Requirement Volatility, Test Coverage, Cost of Quality, Script Execution Time, Test Automation Penetration, Phase Exit Trend, Root Cause Trend, Budget Adherence, Earned Value Trend, Schedule Adherence, Artifact Review Effectiveness, On/Offshore Resource Ratio, Risk-Based Testing Score, Test Data Timeliness, Test Downtime, Test Maturity Level, Test Investment ROI, Customer Satisfaction, Defect Rejection Trend, Operation Transition Status, and Operation Capacity Status.

10. A method of evaluating test operation service delivery of software, the method comprising:
identifying, by a processor, core metrics included in a plurality of metric domains to evaluate a testing service level of one or more tests performed on the software, wherein the plurality of metric domains includes testing maturity, which includes periodic targets for measuring an ability for testing of the software, and at least some of quality, productivity and cycle time, cost, and effort, and wherein the core metrics include a test artifact development trend, test artifact execution trend, test artifact pass trend, defect age, fix backlog trend, retest backlog trend, defect closure trend, defect to artifact trend, cost of poor quality, defect removal effectiveness, and artifact sign-off status;
identifying at least one non-core metric to evaluate the testing service level,
wherein each core and non-core metric is a member of at least one metric cluster of a plurality of metric clusters, each metric cluster having an associated different key question;
determining measurements for the core metrics for the plurality of metric domains and for the at least one non-core metric;
extracting test metric measurement data associated with at least one system under test (SUT), wherein the at least one SUT includes at least one of a software application and an information technology (IT) solution;
determining a trend from the measurements;
determining, by a computer system, whether the trend meets an associated target;
in response to a determination that the trend does not meet the associated target, determining a failed metric from the core metrics and the at least one non-core metric based upon the measurements for the core metrics and the at least one non-core metric associated with the trend;
identifying a trend indicator to explain why the trend did not meet the associated target;
identifying at least one other metric in the metric cluster associated with the failed metric;
identifying the key question associated with the associated metric cluster;
monitoring the identified at least one other metric over time to confirm an accuracy of the trend and providing an associated corrective action for the trend, wherein the trend includes the test artifact execution trend, the test artifact pass trend, the defect age, the fix backlog trend, the retest backlog trend, the defect closure trend, the defect to artifact trend, the cost of poor quality, the defect removal effectiveness, the artifact sign-off status, and the test artifact development trend, and wherein the associated corrective action for the test artifact development trend includes adjusting a capacity of test team personnel according to skills and experience;
receiving selections including a metric domain selection from the plurality of domains, a project release, and a test phase; and
generating, by the processor, a plurality of views based on the selections, wherein the plurality of views include the trend, the associated target, the core metrics associated with the selected metric domain, the at least one non-core metric, the trend indicator, the key question, the at least one other metric, and the associated corrective action for the trend.

11. The method of claim 10, further comprising:
storing data from a plurality of sources;
benchmarking the trend with the data to determine whether the trend meets an associated target;
determining whether the trend is outside a tolerance based on the benchmarking; and
if the trend is outside the tolerance, performing trend analysis to explain the trend.

12. The method of claim 11, wherein performing the trend analysis comprises:
generating a correlated view of measurements of the metrics in the metric cluster, wherein the correlated view indicates correlations between the metrics in the metric cluster that explain the trend.

13. The method of claim 12, wherein the plurality of metric clusters comprise:
Test Artifact Management, Defect Productivity, Defect Extended Management, Defect Density, Test & Requirement Coverage, Cost of Testing, Test Process Productivity, Phase/Stage Containment, Cost/Schedule/PPM, Maturity, Operation Transition Management, and Operation Capacity Management.

14. The method of claim 10, wherein determining the trend from the measurements comprises:
scoring the metrics over time; and
determining a trend for one or more of the metric domains based on the scored metrics.

15. The method of claim 10, further comprising:
determining categories of metrics for the plurality of domains, for test phases, for trend perspectives, and for test levels, and the identifying of the core metrics and the at least one non-core metric is based on a selection of one or more of the categories.

16. The method of claim 10, wherein the core metrics and the at least one non-core metric are metrics for evaluating defect tracking and management, testing maturity, budgetary and schedule tracking, return on investment (ROI), and resource capacity against work demand and against a corresponding statement of work.

17. A non-transitory computer readable medium storing machine readable instructions that when executed by a computer system performs a method of evaluating test operation service delivery of software, the instructions to cause the computer system to:
identify core metrics included in a plurality of metric domains to evaluate a testing service level of one or more tests performed on the software, wherein the plurality of metric domains includes testing maturity, which includes periodic targets for measuring an ability for testing of the software, and at least some of quality, productivity and cycle time, cost, and effort, and wherein the core metrics include a test artifact development trend, test artifact execution trend, test artifact pass trend, defect age, fix backlog trend, retest backlog trend, defect closure trend, defect to artifact trend, cost of poor quality, defect removal effectiveness, and artifact sign-off status;
identify at least one non-core metric to evaluate the testing service level,
wherein each core and non-core metric is a member of at least one metric cluster of a plurality of metric clusters, each metric cluster having an associated different key question;
determine measurements for the core metrics for the plurality of metric domains and for the at least one non-core metric;
extract test metric measurement data associated with at least one system under test (SUT), wherein the at least one SUT includes at least one of a software application and an information technology (IT) solution;
determine a trend from the measurements;
determine whether the trend meets an associated target;
in response to a determination that the trend does not meet the associated target, determine a failed metric from the core metrics and the at least one non-core metric based upon the measurements for the core metrics and the at least one non-core metric associated with the trend;
identify a trend indicator to explain why the trend did not meet the associated target;
identify at least one other metric in the metric cluster associated with the failed metric;

identify the key question associated with the associated metric cluster;

monitor the identified at least one other metric over time to confirm an accuracy of the trend and provide an associated corrective action for the trend, wherein the trend includes the test artifact execution trend, the test artifact pass trend, the defect age, the fix backlog trend, the retest backlog trend, the defect closure trend, the defect to artifact trend, the cost of poor quality, the defect removal effectiveness, the artifact sign-off status, and the test artifact development trend, and wherein the associated corrective action for the test artifact development trend includes adjusting a capacity of test team personnel according to skills and experience;

receive selections including a metric domain selection from the plurality of domains, a project release, and a test phase; and generate a plurality of views based on the selections, wherein the plurality of views include the trend, the associated target, the core metrics associated with the selected metric domain, the at least one non-core metric, the trend indicator, the key question, the at least one other metric, and the associated corrective action for the trend.

18. The non-transitory computer readable medium of claim 17, wherein the instructions are to further cause the computer system to:

store data from a plurality of sources;

benchmark the trend with the data to determine whether the trend meets an associated target;

determine whether the trend is outside a tolerance based on the benchmarking; and in response to determining that the trend is outside the tolerance, perform trend analysis to explain the trend.

19. The non-transitory computer readable medium of claim 18, wherein to identify the trend indicator to explain why the trend did not meet the associated target, the instructions are to cause the computer to:

generate a correlated view of measurements of the metrics in the metric cluster, wherein the correlated view indicates correlations between the metrics in the metric cluster that explain the trend.

* * * * *